United States Patent
Katata et al.

(10) Patent No.: US 7,602,683 B2
(45) Date of Patent: Oct. 13, 2009

(54) INFORMATION RECORDING APPARATUS AND METHOD, INFORMATION RECORDING/REPRODUCING APPARATUS AND METHOD AND COMPUTER PROGRAM

(75) Inventors: Keiji Katata, Saitama (JP); Takeshi Koda, Saitama (JP); Masayoshi Yoshida, Saitama (JP)

(73) Assignee: Pioneer Corporation, Tokyo (JP)

( * ) Notice: Subject to any disclaimer, the term of this patent is extended or adjusted under 35 U.S.C. 154(b) by 218 days.

(21) Appl. No.: 10/591,240

(22) PCT Filed: Feb. 28, 2005

(86) PCT No.: PCT/JP2005/003290

§ 371 (c)(1),
(2), (4) Date: Oct. 31, 2006

(87) PCT Pub. No.: WO2005/083688

PCT Pub. Date: Sep. 9, 2005

(65) Prior Publication Data

US 2007/0189139 A1 Aug. 16, 2007

(30) Foreign Application Priority Data

Mar. 1, 2004 (JP) ............................. 2004-056712

(51) Int. Cl.
*G11B 7/00* (2006.01)

(52) U.S. Cl. ............... 369/47.53; 369/53.16; 369/53.36

(58) Field of Classification Search ............... 369/47.53, 369/53.36, 53.31, 53.16
See application file for complete search history.

(56) References Cited

U.S. PATENT DOCUMENTS 7,170,835 B1 * 1/2007 Roh et al. ................ 369/47.53

FOREIGN PATENT DOCUMENTS

| JP | 04-263129 | 9/1992 |
| JP | 06-044563 | 2/1994 |
| JP | 10-255266 | 9/1998 |
| JP | 2001-307327 | 11/2001 |
| JP | 2002-352517 | 12/2002 |

* cited by examiner

*Primary Examiner*—Thang V Tran
(74) *Attorney, Agent, or Firm*—Young & Thompson

(57) ABSTRACT

An information recording apparatus includes: a recording device capable of recording information into a data area of an information recording medium, by irradiating laser light, in conformity with a predetermined error correction method; an optimum-recording-power detecting device for obtaining an optimum recording power of the laser light, by recording test writing data into a data area portion with a length which is equal to or less than an allowable defect length in the predetermined error correction method, within the data area, by using the recording device; and a controlling device for controlling the recording device to record the information into the data area with the obtained optimum recording power.

13 Claims, 12 Drawing Sheets

[FIG. 1]
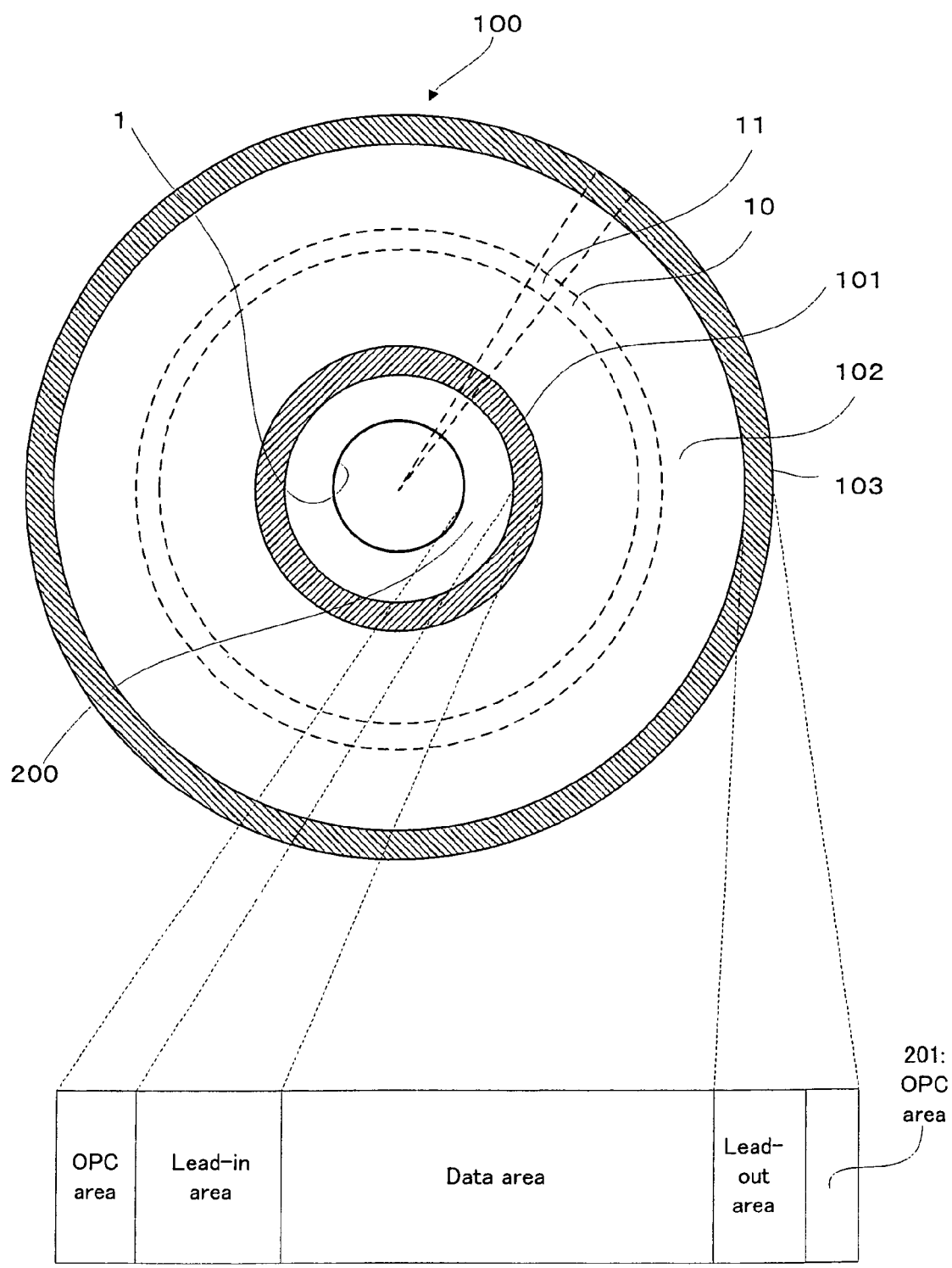

[FIG. 2]
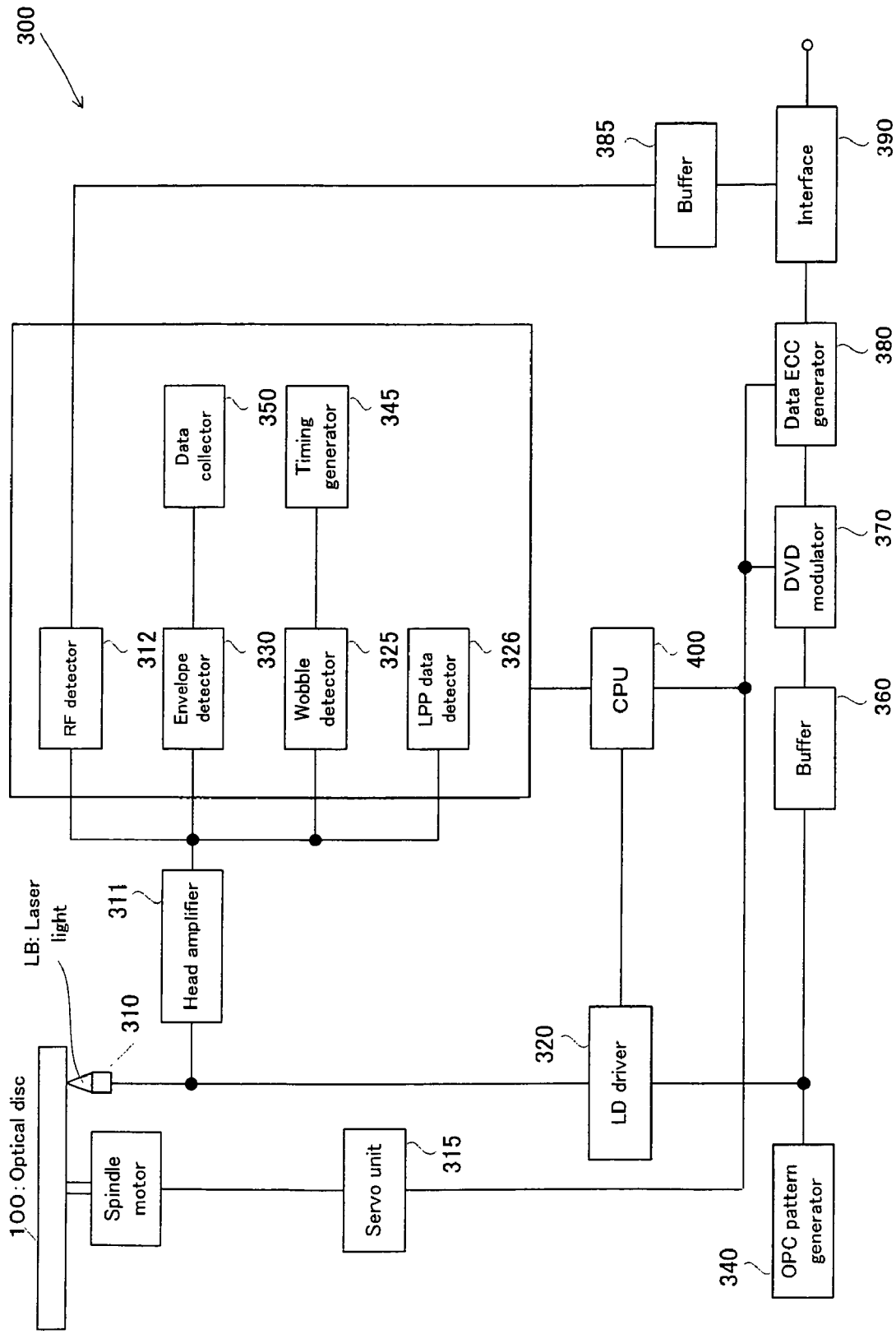

[FIG. 3]
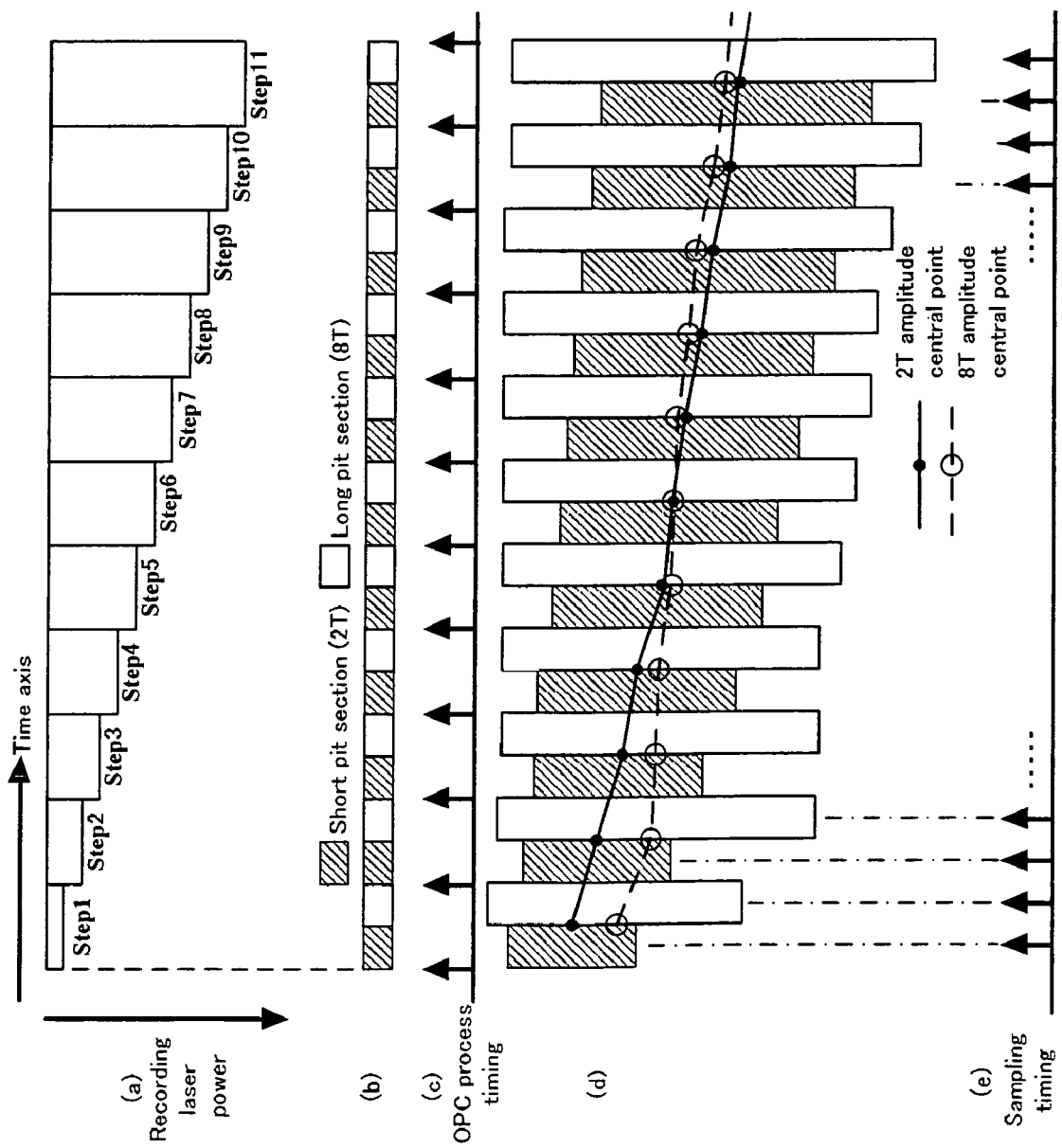

[FIG. 4]
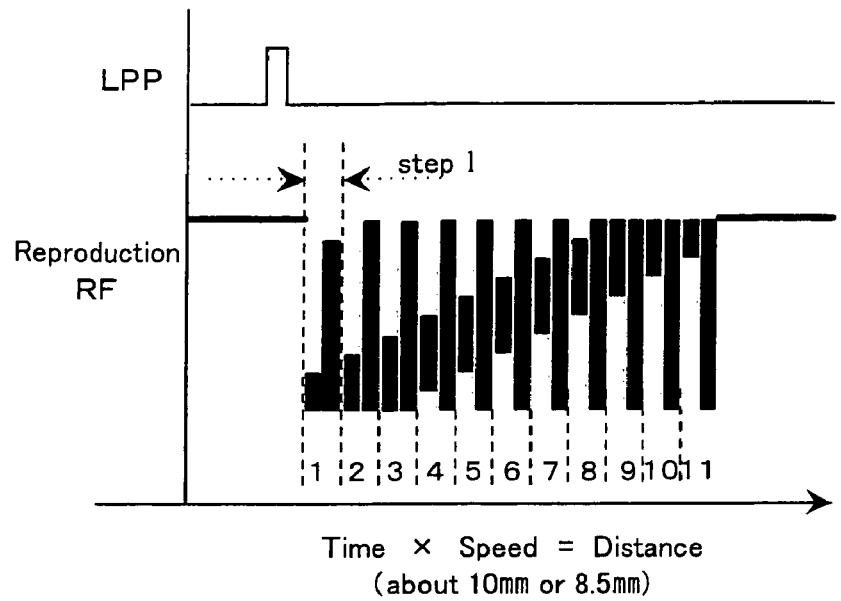
[FIG. 5]
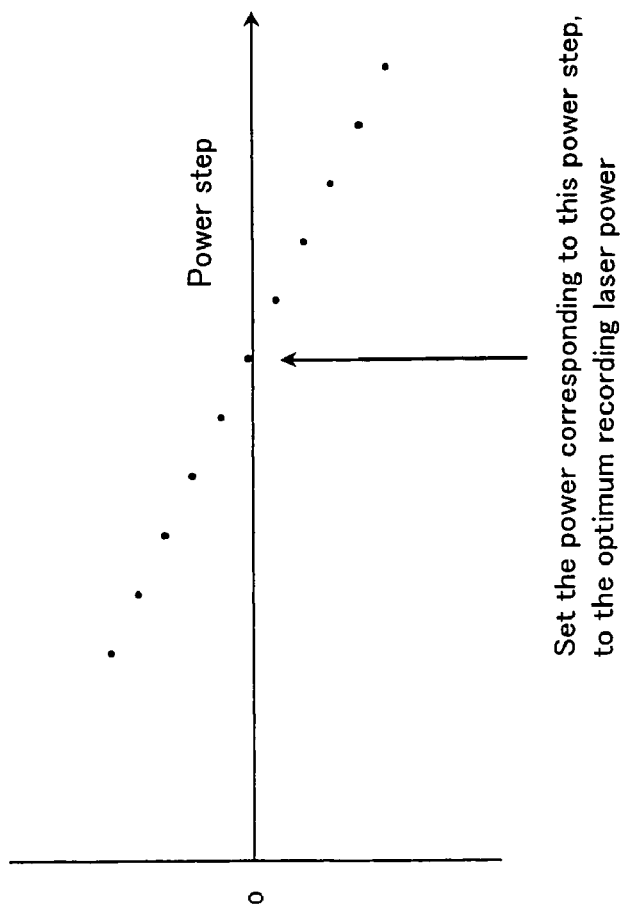

[FIG. 6]
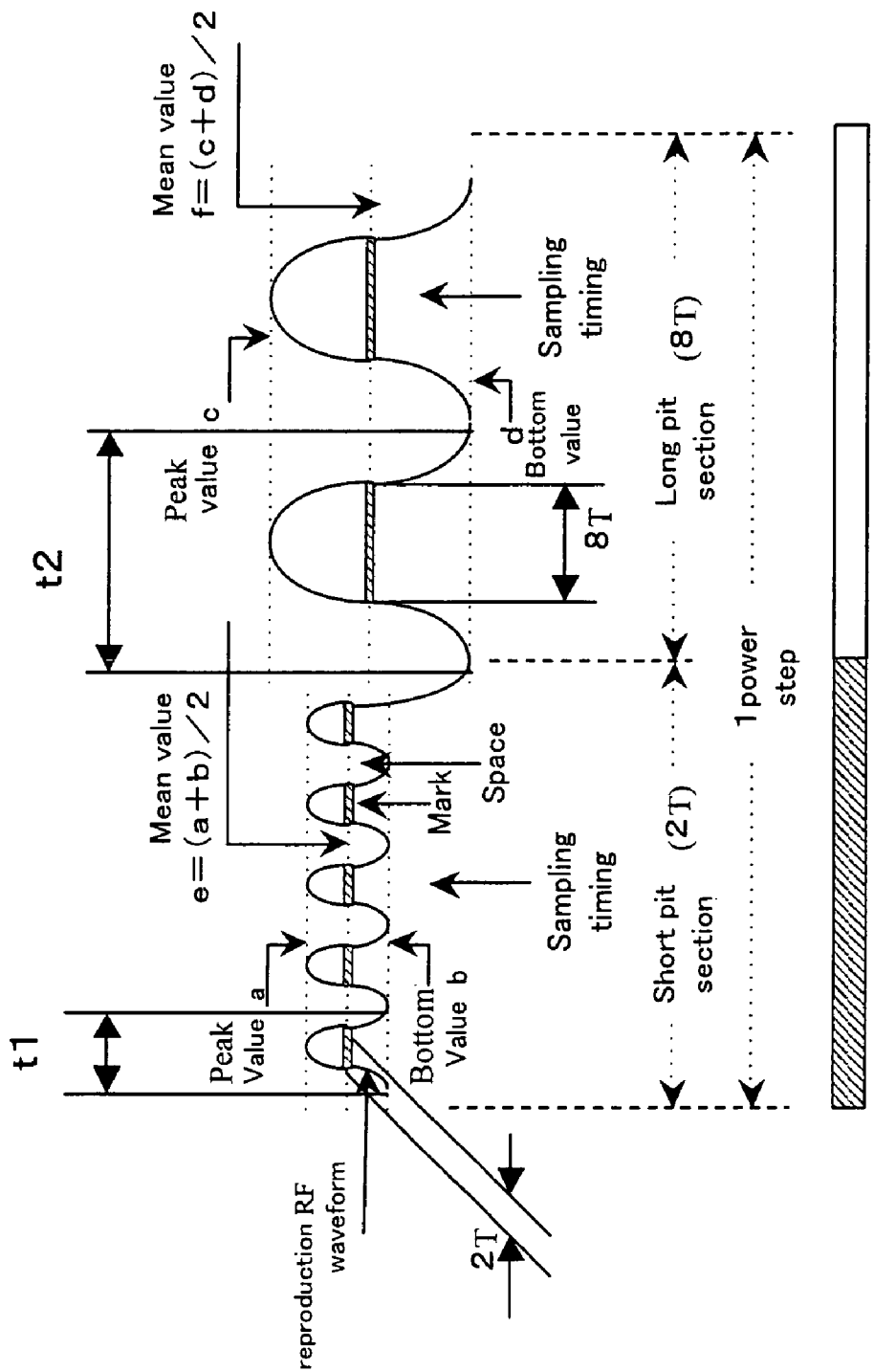

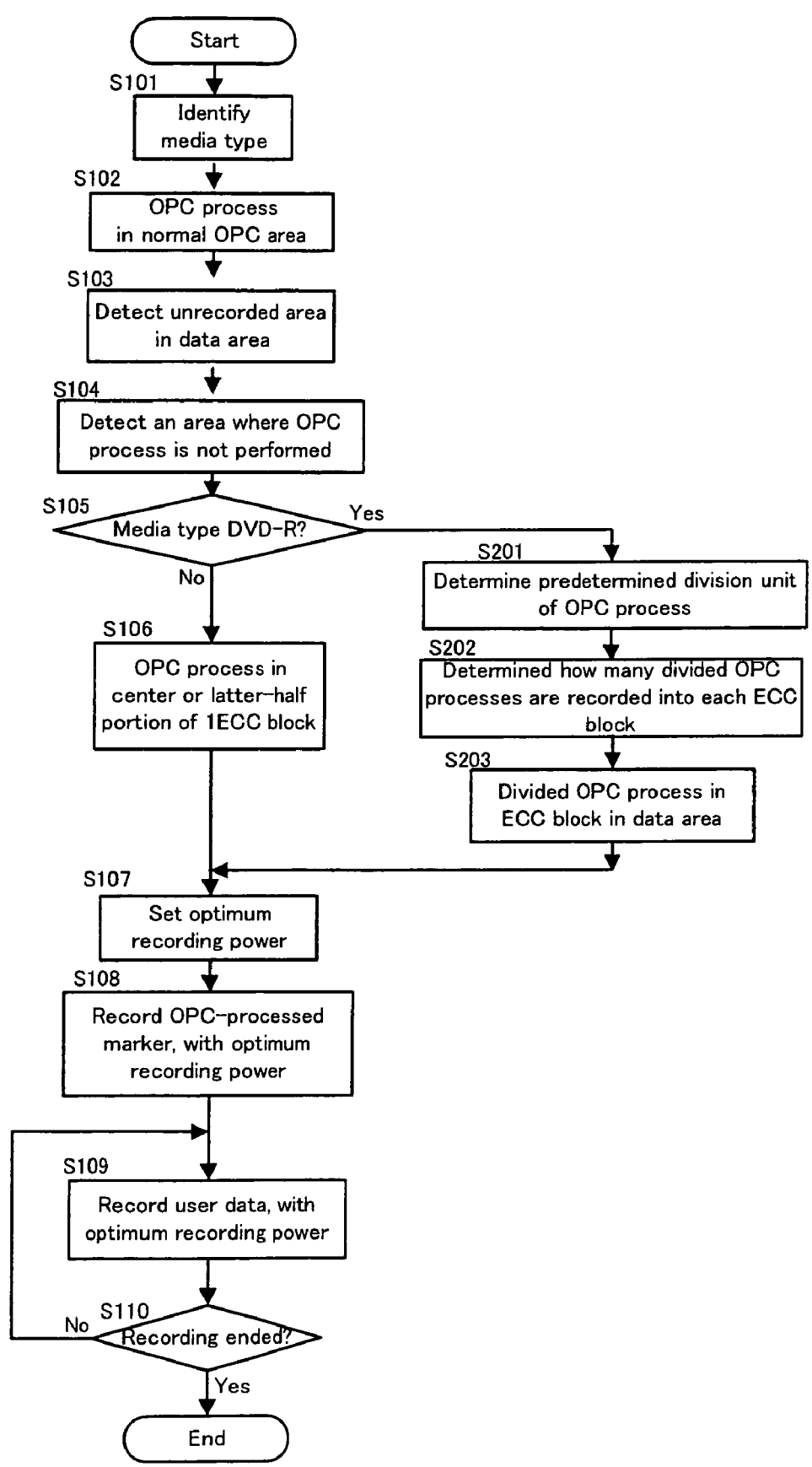

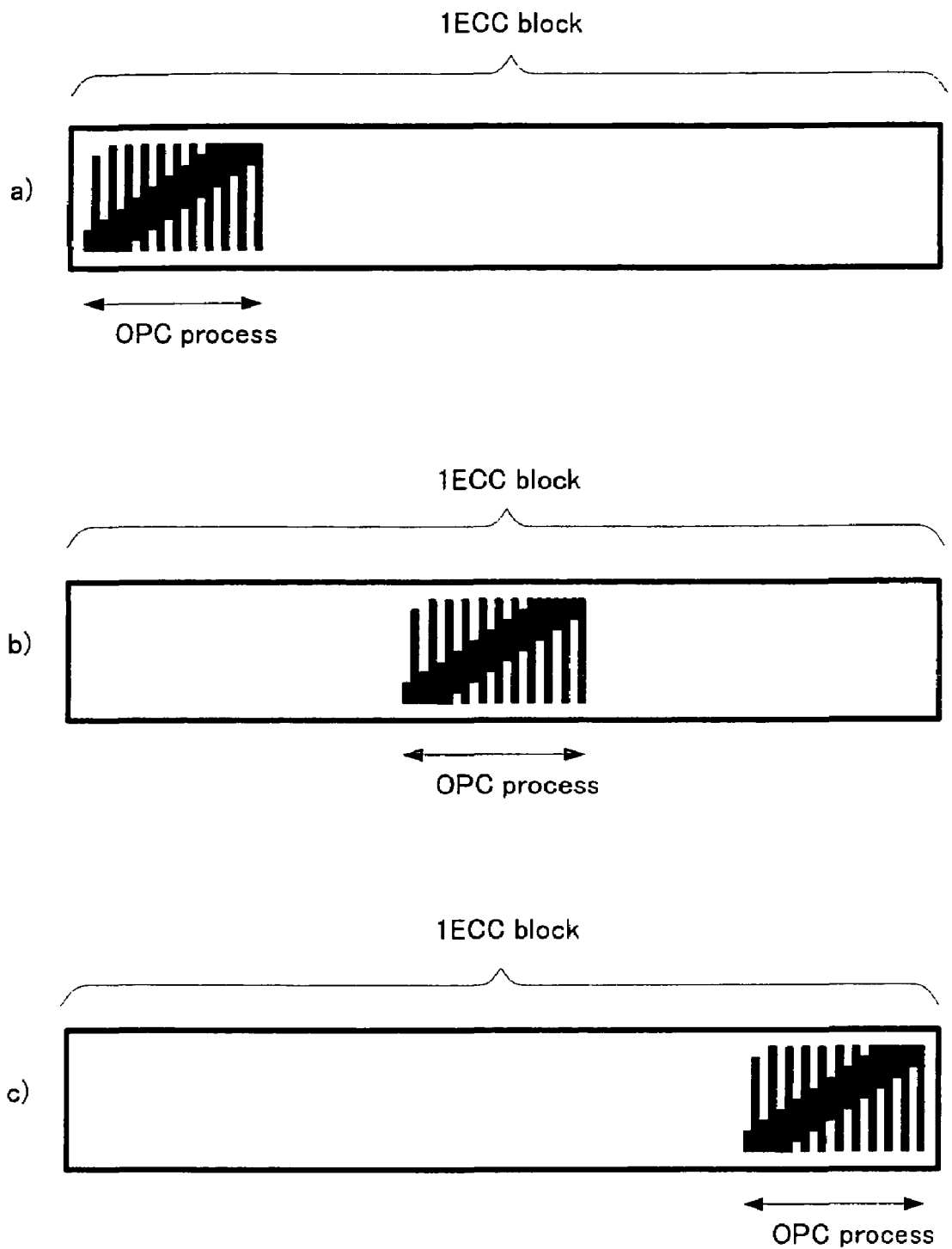

[FIG. 9]
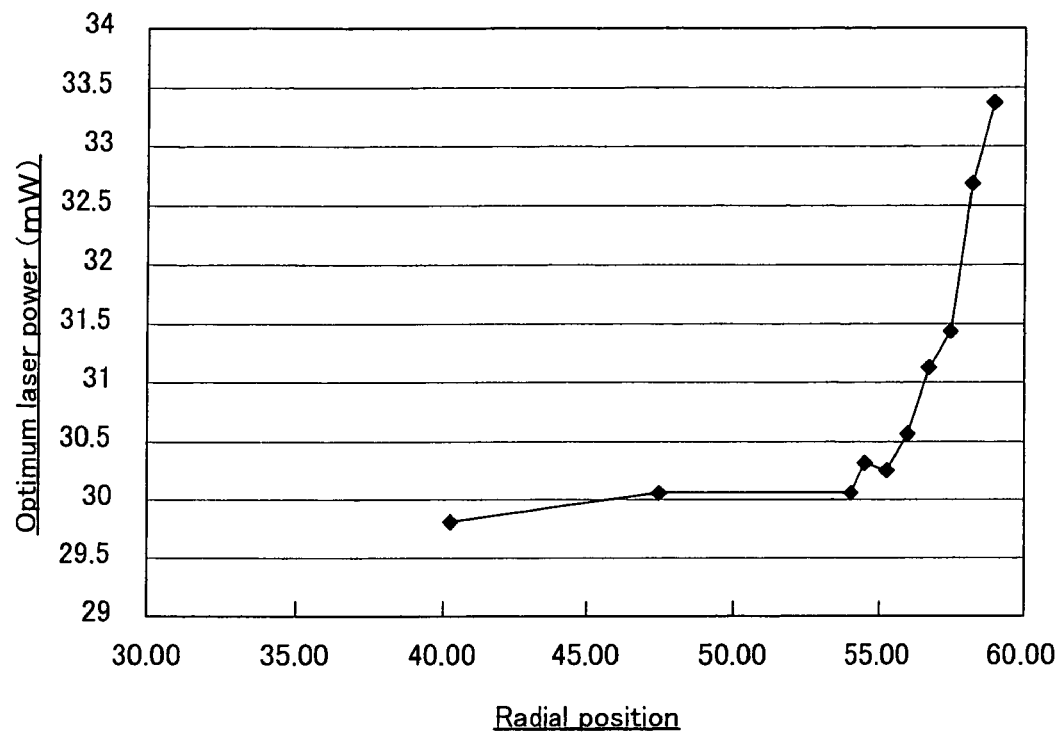
[FIG. 10]
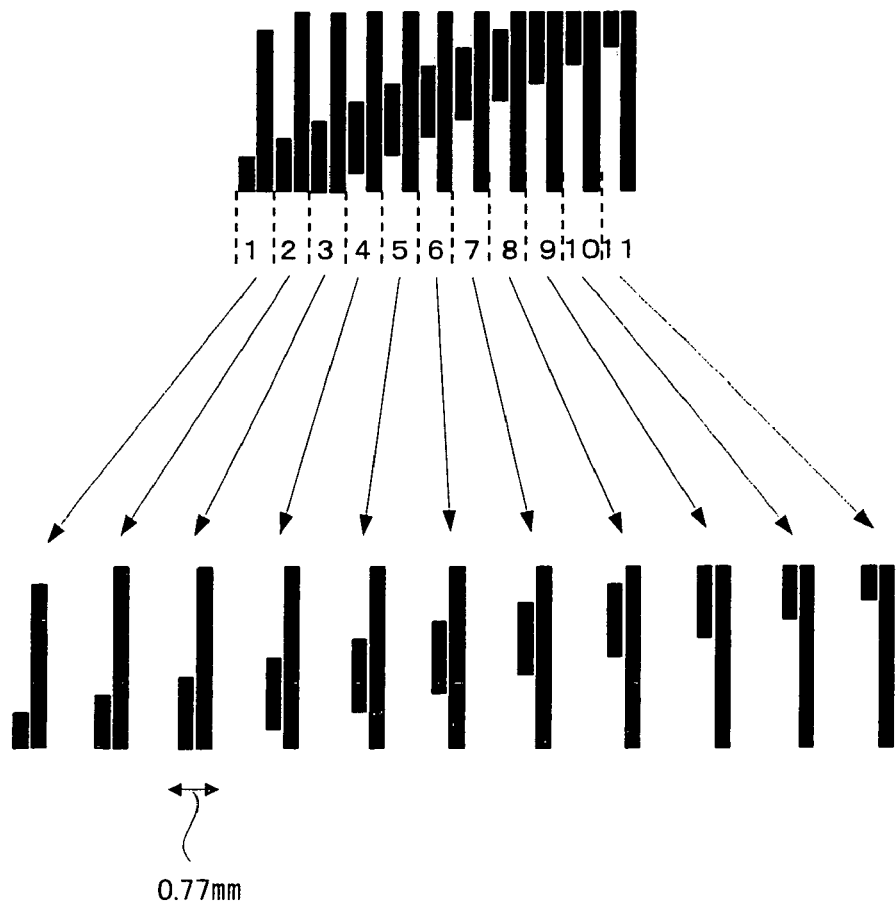

[FIG. 11]
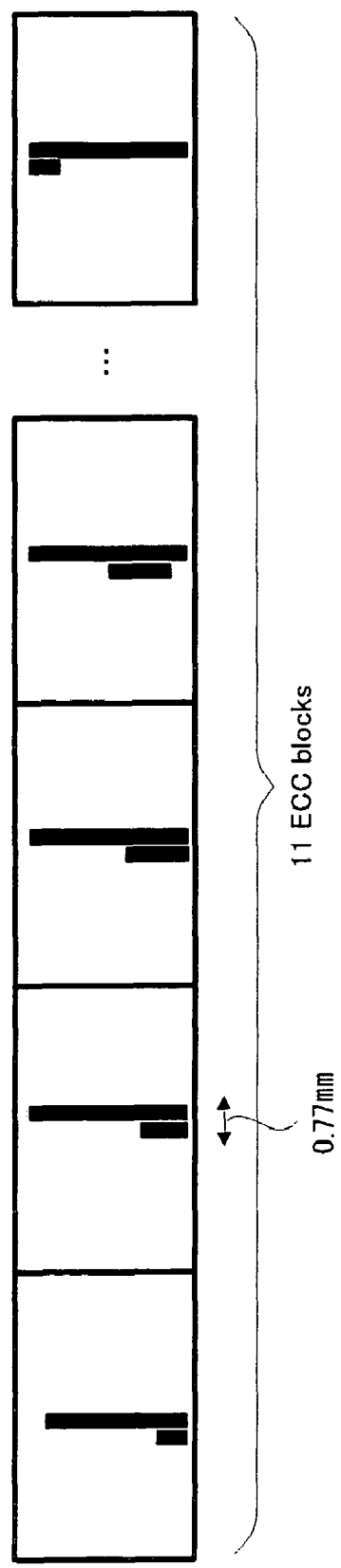

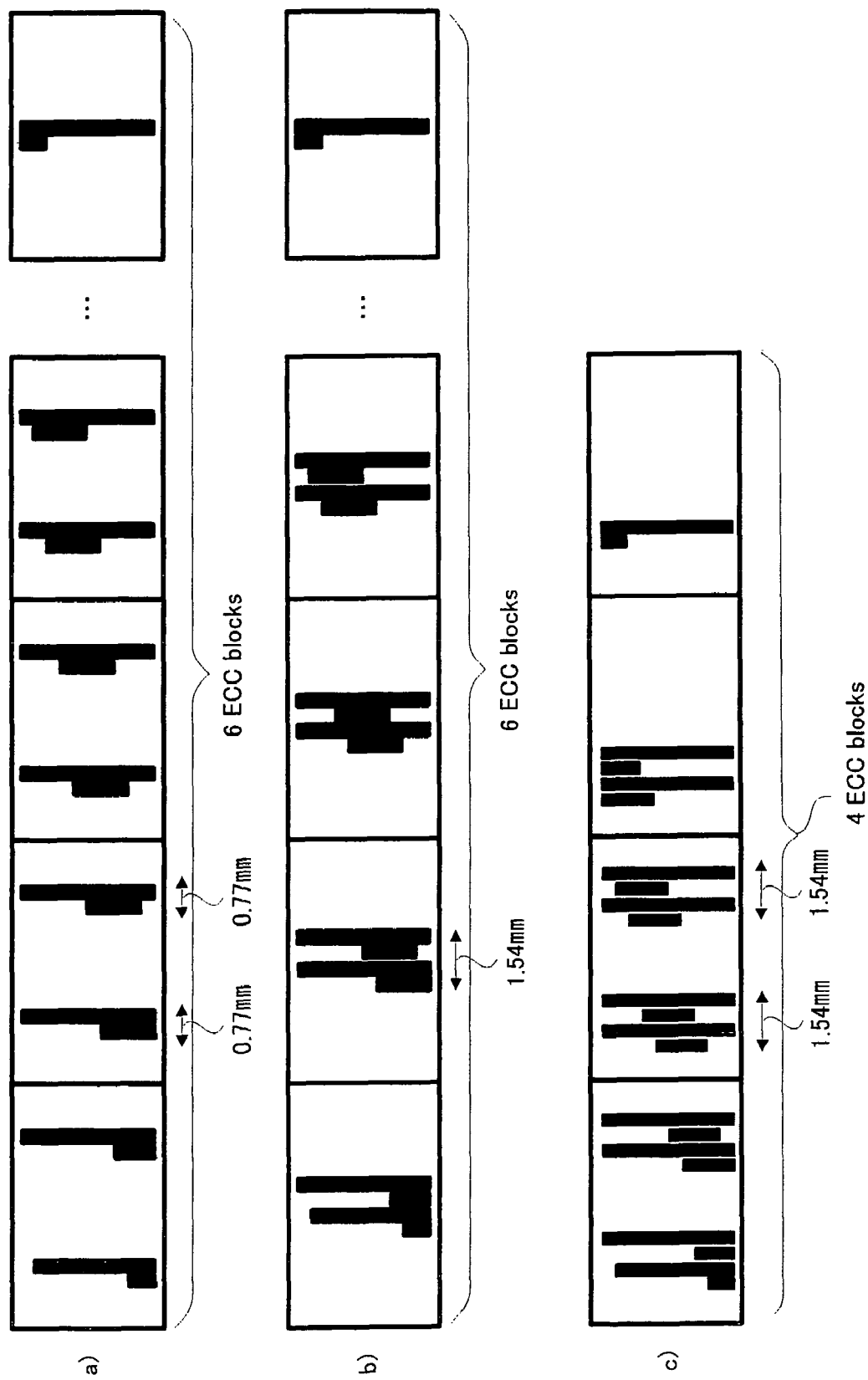
[FIG. 12]

[FIG. 13]
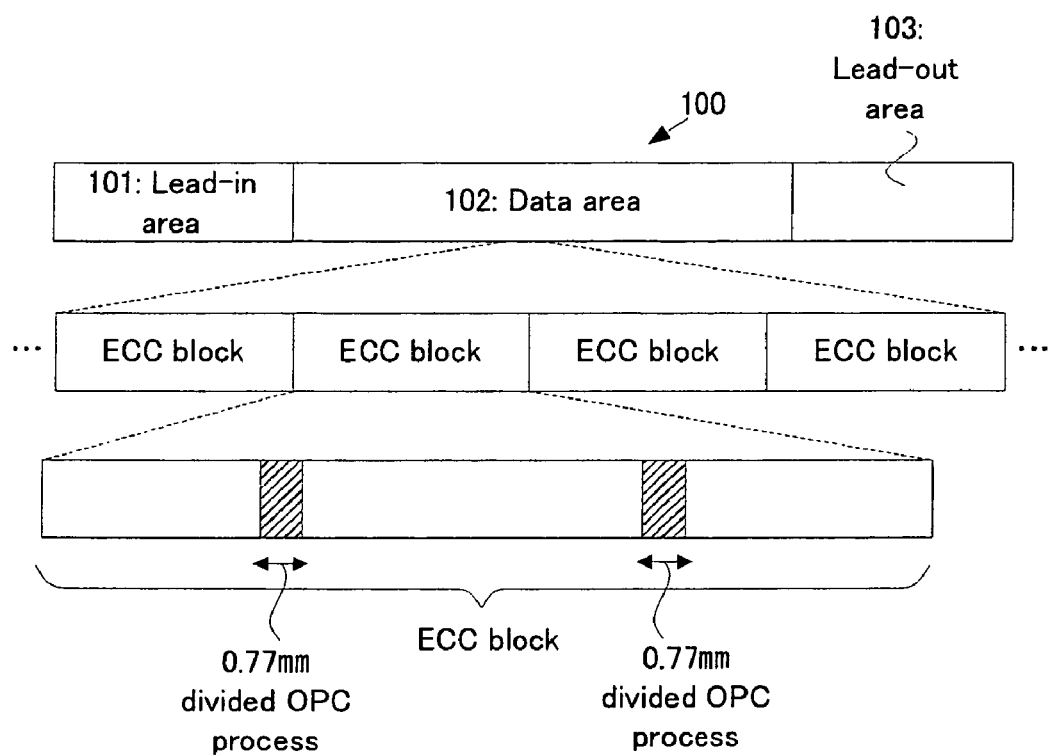

[FIG. 14]
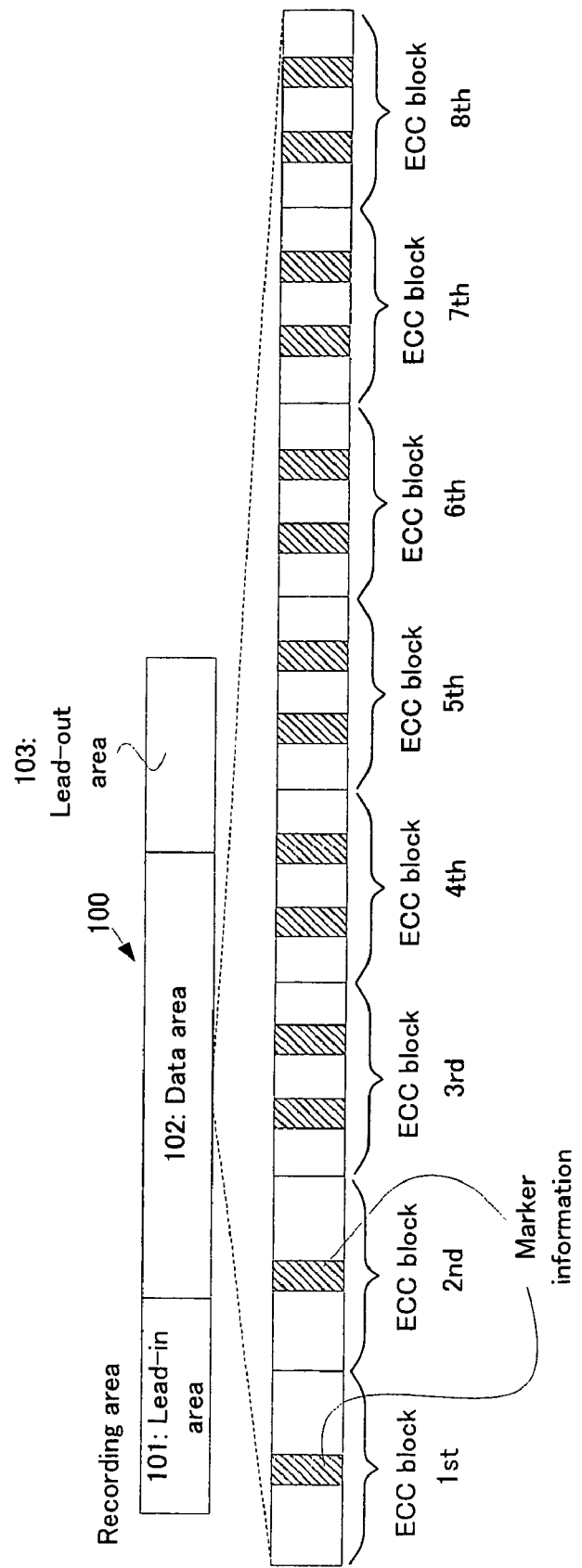

INFORMATION RECORDING APPARATUS AND METHOD, INFORMATION RECORDING/REPRODUCING APPARATUS AND METHOD AND COMPUTER PROGRAM

TECHNICAL FIELD

The present invention relates to an information recording apparatus, such as a write-once type (or recordable) optical disc recorder, for example, for recording information onto an information recording medium, such as a recording type optical disc, an information recording method of detecting an optimum recording power, executed on the information recording apparatus, an information recording/reproducing apparatus, and an information recording/reproducing method.

BACKGROUND ART

On an information recording/reproducing apparatus for recording information onto an information recording medium, such as an optical disc, for example, calibration of a recording laser power is performed by an Optimum Power Control (OPC) process according to the type of the optical disc, the type and the recording speed of the information recording/reproducing apparatus, and the like, to thereby set an optimum recording power. This corresponds to variations in recording features of an information recording surface of the optical disc. For example, if the optical disc is inserted or loaded and a command to write is inputted, light intensity is changed sequentially step-by-step, and test writing data is recorded into an OPC area, which is an exclusive test writing area, and a so-called trial writing process is performed. After that, the test writing data recorded in this manner is reproduced. The reproduction result is judged by a predetermined evaluation standard, to thereby set the optimum recording laser power.

More specifically, for example, in the case of a DVD-R, the OPC area is provided with about 400 ECC blocks (clusters), for example, and one ECC block is equivalent to 16 sectors, for example. Here, the "one ECC block" is a management unit on a disc-shaped storage device, and the smallest unit upon error-correcting. In particular, this 1ECC block is about 83 mm long in a track direction, for example, and as described later, it can perform error correction on an about 5 mm defect. On the other hand, the "sector" is the smallest data management unit by pre-format address information in which the record data is error-correctable. Moreover, this one sector is equivalent to 26 sync (or synchronization) frames, and one sync frame (hereinafter referred to as a SF, as occasion demands) is formed from a pre-pit, which is the smallest unit of an address structure. The 4SF is regarded as a unit of the power-step of one OPC process, for example.

Using the unit of the power-step, if the one OPC process is provided with 11 power-steps, for example, the shortest pit length, 2T, and the longest pit length, 8T, of an 8/16 modulated test signal are recorded, with respect to 44SF, with an 11-stage laser power, to thereby perform the OPC process. Namely, 44SF (i.e. about 1.7 sectors) are used for one OPC process. Then, an "OPC pattern", which is a predetermined pattern including a plurality of test writing recording pits (i.e. OPC pits), is recorded in each power step, with respect to each 4SF.

Therefore, for example, in one disc or one OPC area provided for the one disc, it is possible to perform the OPC process about 3800 times corresponding to the total number of ECC blocks (about 400 ECC blocks).

In addition, there is also disclosed a technology, named as running OPC, of adjusting a recording laser power in real time, in response to the condition of the recording surface where the writing is actually performed, at the time of writing.

Patent document 1: Japanese Patent Publication NO. 3159454

Patent document 2: Japanese Patent Application Laid Open NO. 2002-352517

DISCLOSURE OF INVENTION

Subject to be Solved by the Invention

However, the fact that spin coating is used in most cases as a general method of manufacturing the write-once type optical disc, as one factor, triggers the variations in recording features in the position of the information recording surface of the write-once type optical disc. More specifically, it turns out that the value of the optimum recording power increases with movement from the inner to the outer circumferential side. Then, with respect to the optical disc, it is not desirable to apply the value of the optimum recording power detected in the OPC process performed in the OPC area located on the inner circumferential side, at a constant state on the outer circumferential side, in terms of a proper recording operation corresponding to the features of the information recording surface.

Moreover, if the data is recorded at different speeds onto the same optical disc, the optimum recording power also greatly depends on the recording speed. If writing is performed at a different speed, such as a 4×speed, with the value of the optimum recording power detected in the OPC process performed at a 1×speed, it is difficult to perform the proper recording operation corresponding to the features in the position of the information recording surface.

In this regard, the following method has been used; namely, the recording features corresponding to the type of the optical disc, the position of the information recording surface, and the recording speed, are researched in advance, and the reference value of the optimum recording power based on the recording features corresponding to the parameters, such as the type of the optical disc, is registered in the firmware of a disc drive, and in the actual recording operation, the registered reference value is used to estimate the value of the optimum recording power. Thus, it is necessary to mount algorithm for estimating the value of the optimum recording power, in the firmware program of the drive. However, a change in recording features is not always simple, but sometimes exponential, so it is anomalistic. Thus, there is a technical problem that it is actually difficult to accurately estimate the amount of the change in the value of the optimum recording power. Moreover, in this case, if a new optical disc is released, in order to properly record information onto the optical disc, it is necessary to update the firmware program of the disc drive to register information about the recording features of the new optical disc. However, particularly in the case of a DVD recorder for consumer use, a user hardly or does not voluntarily update the firmware program at all, and the present situation is that it is practically difficult to perform the recording operation corresponding to the recording features of the new optical disc.

In order to solve the above-mentioned conventional problem, it is therefore an object of the present invention to provide an information recording apparatus which enables accurate detection of the value of the optimum recording power corresponding to the variations in recording features of the information recording surface, with respect to the information recording medium, such as the write-once type (or recordable) optical disc, and an information recording method of detecting the optimum recording power, executed on the information recording apparatus, an information recording/reproducing apparatus, an information recording/ reproducing method, and a computer program.

Means for Solving the Subject (Information Recording Apparatus)

Hereinafter, the information recording apparatus of the present invention will be explained.

The above object of the present invention can be achieved by an information recording apparatus provided with: a recording device capable of recording information into a data area of an information recording medium, by irradiating laser light, in conformity with a predetermined error correction method; an optimum-recording-power detecting device for obtaining an optimum recording power of the laser light, by recording test writing data into a data area portion with a length which is equal to or less than an allowable defect length in the predetermined error correction method, within the data area, by using the recording device; and a controlling device for controlling the recording device to record the information into the data area with the obtained optimum recording power.

According to the information recording apparatus of the present invention, firstly, if the information recording medium is loaded, a seek operation is performed by an optical pickup or the like, for example, to thereby obtain the data which will be reproduced by a decoder, for example. By this, various management data required for various processes of the information recording medium is obtained. On the basis of the management data, the information recording medium is accessed, in accordance with an instruction from a host apparatus or a backend or the like, for example.

Then, if a command to write is inputted from the host apparatus or the like, the recording device is displaced to an OPC area, which is an exclusive test writing area, for example. At the same time, under the control of the optimum-recording-power detecting device, a recording laser power is changed sequentially step-by-step, and the test writing data is recorded into the OPC area. More specifically, the "test writing data" of the present invention is classified to an "OPC pit" and an "OPC pattern". For example, a recording pit test-written into the OPC area for detection of the optimum recording power is referred to as the "OPC pit", as occasion demands. Then, a pit pattern, normally including a plurality of OPC pits and recorded in one power step (i.e. with a constant recording laser power) for the OPC process, is referred to as the "OPC pattern".

Then, after completion of such test writing of the test writing data in the OPC area, for example, under the control of the optimum-recording-power detecting device, the test-written OPC pattern is reproduced, and the reproduced OPC pattern is sequentially sampled, to thereby obtain the optimum recording power. Incidentally, more specifically, by virtue of pre-format address information expressed by a land pre-pit, for example, it is possible to match the timing between the recording and the reproduction of the OPC pattern which is the test writing data, so that the OPC process can be performed.

Particularly in the present invention, in the "data area portion" of the present invention having the length which is equal to or less than the allowable defect length in the predetermined error correction method, within the data area of WO Media (Write Once Media), such as a CD-R, a DVD-R, and a BD (Blu-ray Disc)-R, i.e. the write once type (or recordable) information recording medium, the OPC process is performed to thereby obtain the optimum recording power, under the control of the optimum-recording-power detecting device. The "allowable defect length" herein is the maximum length of a defect whose generation is accepted. More specifically, the allowable defect length is the maximum length of a physical defect whose generation is accepted in the information recording surface because the information (or the data information), such as user data, can be restored by the error correction even if dropout, such as a random error or a burst error, occurs by an error correction unit with a predetermined information amount, such as 1ECC block, for example, at the time of reproduction.

Next, according to the information recording apparatus of the present invention, under the control of the controlling device, the information is recorded with the optimum recording power, by the recording device, by regarding the data area portion where the OPC process is performed as a normal unrecorded data area. Namely, in the data area portion where the OPC pattern is recorded, the information is overwritten therein, or written with the data area portion avoided.

Then, the information overwritten within the data area portion or recorded with the data area portion avoided causes a burst error or the like because of destruction of the information recorded associated with the data area portion; however, the amount of the information is smaller than the allowable defect length, so that the information can be restored and reproduced. In other words, if the information recorded in the data area is error-corrected in the predetermined error correction method at the time of reproduction, the test writing data is treated the same as defect data. At that time, particularly, the test writing data is recorded with the length which is equal to or less than the allowable defect length in the predetermined error correction method, so that it is possible to eliminate the test writing data without difficulty as a part of defect in the predetermined error correction method, and thus the information can be reproduced without difficulty.

Thus, it is possible to realize a compatibility or balance between the OPC process in the data area and the normal recording and reproduction of the information.

Consequently, according to the information recording apparatus of the present invention, the OPC process is performed not in the OPC area on the inner or outer circumferential side, but in the area into which the data is actually recorded, such as the data area, so that it is possible to accurately detect the value of the optimum recording power corresponding to the variations in recording features of the information recording surface of the optical disc. Thus, the OPC process is performed even on the optical disc whose variations in the recording features are unknown, in the area into which the data is actually recorded, and in the OPC process, it is possible to perform the recording operation with the detected optimum recording power.

In addition, even in the case where the OPC area or the like is not large enough or where the OPC area is run out, the OPC process can be performed if the unrecorded data area remains. Thus, it is possible to continue the recording operation and extend the lifetime of the optical disc.

Moreover, the OPC process is performed in the data area portion within the data area, which is the area into which the data is actually recorded, so that it is unnecessary to displace the optical pickup or the like, to the OPC area located on the inner or outer circumferential side or the like. Thus, it is possible to reduce a time length required for the OPC process.

In one aspect of the information recording apparatus of the present invention, the optimum-recording-power detecting device uses a near portion of a position into which the information is actually recorded, as the data area portion.

According to this aspect, the OPC process is performed in the area into which the data is actually recorded, such as the data area, for example, so that it is possible to more accurately detect the value of the optimum recording power corresponding to the variations in recording features of the information recording surface of the optical disc.

In another aspect of the information recording apparatus of the present invention, the optimum-recording-power detecting device uses a portion with a length which is shorter than the allowable defect length by a margin set in advance, as the data area portion.

According to this aspect, it is possible to take advantage of the original error correction capability other than the OPC process, within a range of the margin.

Thus, it is possible to more certainly realize a compatibility or balance between the OPC process in the data area and the normal information recording and reproduction.

In another aspect of the information recording apparatus of the present invention, the optimum-recording-power detecting device uses a portion other than a portion where a synchronization signal is recorded in the data area, as the data area portion.

According to this aspect, there is no chance to prevent the reproduction of the sync (or synchronization) signal necessary for the recording and the reproduction.

Thus, it is possible to more certainly realize a compatibility or balance between the OPC process in the data area and the normal information recording and reproduction.

In another aspect of the information recording apparatus of the present invention, the optimum-recording-power detecting device uses a portion with a length within a tolerance of a tracking servo error in tracking servo when the information is recorded or reproduced, as the data area portion.

According to this aspect, the portion with the length within the tolerance of the tracking servo error in tracking servo is used, so that there is no chance to make even various tracking servo inexecutable because of the presence of the test writing data, even if the information on the optical disc is reproduced by a drive in the tracking servo system. More specifically, the "length within the tolerance of the tracking servo error in tracking servo" is the maximum length of a physical defect which is accepted in the normal control of various tracking servo, when the information on the optical disc is recorded or reproduced by the information recording apparatus adopting different types of tracking servo. Incidentally, a push-pull tracking method is adopted in a CD-R, a DVD-R, or a BD-R recording apparatus, and a tracking method by phase difference is adopted a CD-ROM or DVD-ROM read-only drive. More specifically, in the case of a DVD-R or a BD-R, the OPC process is performed in the area with the length which is equal to or less than the allowable defect length, in unrecorded one ECC block in the data area, for example. Alternatively, in the case of a CD-R, the OPC process is performed in the area with the length which is equal to or less than the allowable defect length, in an unrecorded block composed of continuous 4 sectors. In particular, it is desirable to perform the OPC process in an area with a length which is about 70% of the allowable defect length.

In another aspect of the information recording apparatus of the present invention, the optimum-recording-power detecting device uses a portion with a length which is equal to or less than the allowable defect length, by each error correction unit (ECC block) in the predetermined error correction method, as the data area portion.

According to this aspect, even if the test writing data is large data, such as beyond the allowable defect length, with respect to the error correction unit, such as one ECC block, the error correction can be performed by each error correction unit.

In another aspect of the information recording apparatus of the present invention, the optimum-recording-power detecting device distributes the data area portion into a plurality of error correction units in the predetermined error correction method, in a form of a divided portion with a length which is equal to or less than the allowable defect length, if the test writing data is longer than the allowable defect length.

According to this aspect, even if the test writing data is extremely huge data, such as beyond the allowable defect length, with respect to the error correction unit, such as one ECC block, the error correction can be performed by each error correction unit.

More specifically, in the case of the recording with n stages of power steps (wherein n is a natural number) in one OPC process, n pieces of OPC patterns are distributed at least one by one and recorded with different recording laser powers, in the n pieces of distributed data area portions with the length which is equal to or less than the allowable defect length in each error correction unit (ECC block).

In another aspect of the information recording apparatus of the present invention, the information recording medium has an exclusive test writing area to write therein the test writing data, apart from the data area, and the optimum-recording-power detecting device firstly obtains the optimum recording power, by recording the test writing data into the exclusive test writing area by using the recording device before recording the test writing data into the data area portion, and records the test writing data into the data area portion after the exclusive test writing area is filled up with the test writing data.

According to this aspect, the OPC process in the exclusive test writing area, such as the normal OPC area, can be also performed, and it can be firstly judged whether or not the information recording apparatus can perform the normal OPC process. Thus, it is possible to realize the OPC process, more certainly, in the data area.

In addition, it is possible to reduce the exclusive test writing area, such as the OPC area for the primary OPC process, to the minimum necessary. Then, if the exclusive test writing area runs short, the OPC process in the data area is secondarily used, which allows efficient use of the information recording medium.

(Information Recording Method)

Hereinafter the information recording method of the present invention will be explained.

The above object of the present invention can be also achieved by an information recording method on an information recording apparatus provided with a recording device capable of recording information into a data area of an information recording medium, by irradiating laser light, in conformity with a predetermined error correction method, the information recording method provided with an optimum-recording-power detecting process of obtaining an optimum recording power of the laser light, by recording test writing data into a data area portion with a length which is equal to or less than an allowable defect length in the predetermined error correction method, within the data area, by using the recording device; and a controlling process of controlling the recording device to record the information into the data area with the obtained optimum recording power.

According to the information recording method of the present invention, as in the case of the above-mentioned information recording apparatus of the present invention, the OPC process is performed not in the OPC area on the inner or outer circumferential side, but in the area into which the data is actually recorded, such as the data area, so that it is possible to accurately detect the value of the optimum recording power corresponding to the variations in recording features of the information recording surface of the optical disc. Thus, the OPC process is performed even on the optical disc whose variations in the recording features are unknown, in the area into which the data is actually recorded, and in the OPC process, it is possible to perform the recording operation with the detected optimum recording power.

Incidentally, even the information recording method of the present invention can adopt the same aspects as the various aspects of the above-mentioned information recording apparatus of the present invention, as occasion demands.

(Information Recording/Reproducing Apparatus)

Hereinafter the information recording/reproducing apparatus of the present invention will be explained.

The above object of the present invention can be also achieved by an information recording/reproducing apparatus provided with: the above-mentioned information recording apparatus of the present invention (including its various aspects); and a reproducing device for reproducing the information from the information recording medium.

According to the information recording/reproducing apparatus of the present invention, it is possible to receive the same various benefits as those in the case of the above-mentioned information recording apparatus, and it is also possible to reduce the information by using the reproducing device, provided with an optical pickup, a RF detector, or the like, for example.

Incidentally, even the information recording/reproducing apparatus of the present invention can adopt the same aspects as the various aspects of the above-mentioned information recording apparatus of the present invention, as occasion demands.

(Information Recording/Reproducing Method)

Hereinafter the information recording/reproducing method of the present invention will be explained.

The above object of the present invention can be also achieved by an information recording/reproducing method provided with: the above-mentioned information recording method of the present invention (including its various aspects); and a reproducing process of reproducing the information from the information recording medium.

According to the information recording/reproducing method of the present invention, it is possible to receive the same various benefits as those in the case of the above-mentioned information recording/reproducing apparatus, and it is also possible to reduce the information by using the reproducing process, provided with an optical pickup, a RF detector, or the like, for example.

Incidentally, even the information recording/reproducing method of the present invention can adopt the same aspects as the various aspects of the above-mentioned information recording/reproducing apparatus of the present invention, as occasion demands.

(Computer Program)

Hereinafter the computer programs of the present invention will be explained.

The above object of the present invention can be also achieved by a first computer program of instructions for recording control and for tangibly embodying a program of instructions executable by a computer provided in the above-mentioned information recording apparatus of the present invention (including its various aspects), the computer program making the computer function as at least one portion of the recording device, the optimum-recording-power detecting device, and the controlling device.

According to the first computer program of the present invention, the above-mentioned embodiment of the information recording apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, even the first computer program of the present invention can adopt the same aspects as the various aspects of the above-mentioned information recording apparatus of the present invention, as occasion demands.

The above object of the present invention can be also achieved by a second computer program of instructions for recording/reproduction control and for tangibly embodying a program of instructions executable by a computer provided in the above-mentioned information recording/reproducing apparatus of the present invention (including its various aspects), the computer program making the computer function as at least one portion of the information recording apparatus and the reproducing device.

According to the second computer program of the present invention, the above-mentioned embodiment of the information recording/reproducing apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, even the second computer program of the present invention can adopt the same aspects as the various aspects of the above-mentioned information recording/reproducing apparatus of the present invention, as occasion demands.

The above object of the present invention can be also achieved by a first computer program product in a computer-readable medium for tangibly embodying a program of instructions executable by a computer provided in the information recording apparatus of the present invention (including its various aspects), the computer program product making the computer function as at least one portion of the recording device, the optimum-recording-power detecting device, and the controlling device.

According to the first computer program product of the present invention, at least one portion of the recording device, the optimum-recording-power detecting device, and the controlling device of the present invention described above can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as at least one portion of the recording device, the optimum-recording-power detecting device, and the controlling device.

The above object of the present invention can be also achieved by a second computer program product in a computer-readable medium for tangibly embodying a program of instructions executable by a computer provided in the information recording/reproducing apparatus of the present invention (including its various aspects), the computer program product making the computer function as at least one portion of the information recording apparatus and the reproducing device.

According to the second computer program product of the present invention, at least one portion of the information recording apparatus and the reproducing device of the present invention described above can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as at least one portion of the information recording apparatus and the reproducing device.

These effects and other advantages of the present invention become more apparent from the following embodiments.

As explained above, according to the information recording apparatus or method, and the information recording/reproducing apparatus or method, of the present invention, it is provided with: the recording device; the optimum-recording-power detecting device or process, and the controlling device or process, and the OPC process is performed in the data area. Thus, it is possible to accurately detect the value of the optimum recording power corresponding to the variations in recording features of the information recording surface of the optical disc. Moreover, according to the computer program for recording control, the OPC process is performed in the area into which the data is actually recorded, such as the data area, so that it is possible to accurately detect the value of the optimum recording power corresponding to the variations in recording features of the information recording surface of the optical disc. Moreover, according to the computer program for recording/reproduction control, the OPC process is performed in the area into which the data is actually recorded, such as the data area, so that it is possible to accurately detect the value of the optimum recording power corresponding to the variations in recording features of the information recording surface of the optical disc.

BRIEF DESCRIPTION OF DRAWINGS

FIG. 1 is a substantial plan view showing the basic structure of an optical disc in an embodiment of the information recording medium of the present invention, the optical disc having a plurality of recording areas, in the upper part, in association with a schematic conceptual view showing a recording area structure in the radial direction in the lower part.

FIG. 2 is a block diagram conceptually showing the basic structure of an information recording/reproducing apparatus in a first embodiment of the information recording apparatus of the present invention.

FIG. 3 is a group of schematic timing charts showing one OPC process in the case of 11 power-steps on the information recording/reproducing apparatus in the first embodiment of the information recording apparatus of the present invention.

FIG. 4 is a schematic signal amplitude diagram showing a reproduction RF signal in one OPC process in the case of 11 power-steps on the information recording/reproducing apparatus in the first embodiment of the information recording apparatus of the present invention.

FIG. 5 is a graph showing asymmetry values plotted in respective power steps in one OPC process on the information recording/reproducing apparatus in the first embodiment of the information recording apparatus of the present invention.

FIG. 6 is a waveform chart showing the detail of one power step out of one OPC process on the information recording/reproducing apparatus in the first embodiment of the information recording apparatus of the present invention.

FIG. 7 is a flowchart showing a flow of the OPC process and the recording operation, performed by the information recording/reproducing apparatus in the first embodiment of the information recording apparatus of the present invention.

FIG. 8 are schematic conceptual views showing relative positions where the OPC process is performed in one ECC block, by the information recording/reproducing apparatus in the first embodiment of the information recording apparatus of the present invention.

FIG. 9 is a graph showing the value of the optimum recording power plotted in the radial direction of a general optical disc.

FIG. 10 is a schematic conceptual view showing division of the OPC process by an information recording/reproducing apparatus in a second embodiment of the information recording apparatus of the present invention.

FIG. 11 is a schematic conceptual view showing such a structure that the divided OPC process is distributed into a plurality of ECC blocks by the information recording/reproducing apparatus in the second embodiment of the information recording apparatus of the present invention.

FIG. 12 are schematic conceptual views showing such a structure that the divided OPC process is distributed into a plurality of ECC blocks and performed by the information recording/reproducing apparatus in third, fourth, and fifth embodiments of the information recording apparatus of the present invention (FIG. 12($a$), FIG. 12($b$), and FIG. 12($c$), respectively).

FIG. 13 is a schematic conceptual view showing such a situation that two of the divided OPC processes are recorded in one ECC block, by the information recording/reproducing apparatus in the third embodiment of the information recording apparatus of the present invention.

FIG. 14 is a schematic conceptual view showing such a structure that marker information is recorded into an ECC block located immediately before the ECC block where the divided OPC process is recorded by the information recording/reproducing apparatus in the third embodiment of the information recording apparatus of the present invention.

DESCRIPTION OF REFERENCE CODES

1 . . . center hole, 10 . . . track, 11 . . . sector, 100 . . . optical disc, 101 . . . lead-in area, 102 . . . data area, 103 . . . lead-out area, 200 and 201 . . . OPC area, 300 . . . information recording/reproducing apparatus, 301 . . . spindle motor, 310 . . . optical pickup, 311 . . . head amplifier, 312 . . . RF detector, 315 . . . servo circuit, 320 . . . LD driver, 325 . . . wobble detector, 326 ... LPP data detector, 330 ... envelope detector, 340 ... OPC pattern generator, 345 ... timing generator, 350 ... data collector, 360 ... buffer, 370 ... DVD modulator, 380 ... data ECC generator, 385 ... buffer, 390 ... interface, 400 ... CPU, LB ... laser light

BEST MODE FOR CARRYING OUT THE INVENTION

Hereinafter, the best mode for carrying out the present invention will be explained in each embodiment in order, with reference to the drawings.

First Embodiment of Information Recording Apparatus

Next, with reference to FIG. 1 to FIG. 9, a detailed explanation will be given for the structure and the operation of a first embodiment of the information recording apparatus of the present invention, and an information recording medium, which is a recording target of the first embodiment of the information recording apparatus of the present invention.

(Information Recording Medium)

Firstly, the basic structure of an optical disc related to the information recording medium, which is a recording target of the first embodiment of the information recording apparatus of the present invention, will be explained with reference to FIG. 1. FIG. 1 is a substantial plan view showing the basic structure of an optical disc in an embodiment of the information recording medium of the present invention, the optical disc having a plurality of recording areas, in the upper part, in association with a schematic conceptual view showing a recording area structure in the radial direction in the lower part.

The information recording medium in the embodiment is a write-once type (or recordable) optical disc on which recording can be performed only once in various destructive writing methods and reproduction can be performed many times.

As shown in FIG. 1, an optical disc 100 has a recording surface on a disc main body with a diameter of about 12 cm, as is a DVD. On the recording surface, the optical disc 100 is provided with: a center hole 1 as the center; an OPC area associated with the embodiment; a lead-in area 101; a data area 102, which is one example of the "data area" of the present invention; and a lead-out area 103, from the inner to the outer circumferential side. Incidentally, an OPC area 201 may be further provided on the outer circumferential side of the lead-out area 103.

Then, in each recording area, a track or tracks 10, such as a groove track and a land track, are alternately placed, spirally or concentrically, centered on the center hole 1. On the track 10, data is recorded by a unit of ECC block, which is an error correctable management unit in which 16 units of sectors 11 are collected.

In the lead-in area 101 and the lead-out area 103, various information for controlling or managing the data recording/reproduction is recorded. For example, the control information is information for controlling the recording into and the reading in the data area 102, and it is, for example, information indicating the attribute, the type, or the like of the information recording medium, information for data address management, information for controlling the recording operation and the reading operation of an information recording/reproducing apparatus, such as a disc drive, for example, and the like.

In the data area 102, data, such as user data, is recorded. Incidentally, the control information and the management information, and the data, which are recorded onto the information recording medium, cannot be always distinguished clearly according to their contents. However, the control information and the management information are information mainly used directly for the operation control of the information recording/reproducing apparatus, such as the disc drive, whereas the data is mainly only a recording or reading target on the information recording/reproducing apparatus and is data mainly used for the data reproduction process or the program execution process performed by a backend or a host computer, for example. According to such a difference in their characteristics or the like, the data is recorded into the data zone 102, whereas the control information and the management information are recorded into the lead-in area 101 and the lead-out area 103.

The OPC areas 200 and 201 are recording areas used in an OPC process described later, i.e. detection of an optimum recording power, i.e. calibration of a recording laser power.

Particularly in the embodiment, it is not limited to the optical disc 100 having the five recording areas, as shown in FIG. 1. For example, the OPC area 200 is not necessarily located on the innermost circumference, but may be located in the lead-in area 101, in the data area 102, or in the lead-out area 103, or the like, in FIG. 1. Alternatively, it may be located between the lead-in area 101 and the data area 102, between the data area 102 and the lead-out area 103, or on the outer circumferential side of the lead-out area 103, or the like. Moreover, the presence of the lead-in area 101 and the lead-out area 103 is also arbitrary; it is only necessary to provide at least two recording areas, which are the OPC area 200 into which the OPC pits or the OPC pattern is recorded and the data area 102 into which the record data is recorded. In addition, such OPC areas may be unified and disposed, or divided into a plurality of areas and disposed.

(Information Recording/Reproducing Apparatus)

Next, with reference to FIG. 2, an explanation will be given for the basic structure of an information recording/reproducing apparatus in the first embodiment of the information recording apparatus of the present invention. FIG. 2 is a block diagram conceptually showing the basic structure of the information recording/reproducing apparatus in the first embodiment of the information recording apparatus of the present invention.

As shown in FIG. 2, an information recording/reproducing apparatus 300 in the embodiment is provided with: a spindle motor 301; an optical pickup 310; a head amplifier 311; a RF detector 312; a servo circuit 315; an LD driver 320; a wobble detector 325; an LPP data detector 326; an envelope detector 330; an OPC pattern generator 340; a timing generator 345; a data collector 350; a buffer 360; a DVD modulator 370; a data ECC generator 380; a buffer 385; an interface 390; and a CPU (Central Processing Unit) 400.

The spindle motor 301 is constructed to rotate the optical disc 100 at a predetermined speed under spindle servo from the servo circuit 315 or the like.

The optical pickup 310 performs the recording or the reproduction with respect to the optical disc 100, and is provided with a semiconductor laser apparatus, various lenses, actuators, or the like. More specifically, upon reproduction, the optical pickup 310 irradiates the optical disc 100 with laser light, as reading laser with a first power. Upon recording, the optical pickup 310 irradiates the optical disc 100 with the laser light, with it modulated, as writing laser with a second power. The optical pickup 310 is constructed to move in the radial direction or the like of the optical disc 100 by a not-illustrated actuator, slider, or the like, driven by the servo circuit 315.

The head amplifier 311 amplifies the output signal of the optical pickup 310 (i.e. reflected light of laser light LB), and outputs the amplified signal. Specifically, the head amplifier 311 outputs a RF signal as a reading signal to the RF detector 312 and the envelope detector 330, and outputs a push-pull signal to the wobble detector 325 and the LPP data detector 326.

The RF detector 312 is constructed to detect and demodulate the RF signal, to thereby output reproduction data to the exterior through the buffer 385 and the interface 390. Then, on external output equipment connected to the interface 390 (e.g. a display device, such as a liquid crystal display and a plasma display, or a speaker, or the like), predetermined contents are reproduced and outputted.

The servo circuit 315 displaces the object lens of the optical pickup 310, on the basis of a tracking error signal, a focus error signal, and the like, which are obtained by processing a received light result of the optical pickup 310, to thereby perform various servo processes, such as tracking control and focus control. Moreover, the servo circuit 315 is constructed to servo-control the spindle motor 301 on the basis of a wobble signal obtained from the wobble of the groove tracks wobbled on the optical disc 100.

The LD drive 320 drives the semiconductor laser disposed in the optical pickup 310, so as to determine an optimum recording power by the recording and reproduction processes of the OPC pattern described later, in the OPC process described later. Then, the LD driver 320 is constructed to drive the semiconductor laser of the optical pickup 310, with the optimum recording power determined by the OPC process in the data recording. In the data recording, the optimum recording power is modulated in accordance with the record data.

Incidentally, one specific example of the "recording device" of the present invention is constructed, including the spindle motor 301, the optical pickup 310, the servo circuit 315, and the LD driver 320 or the like, described above.

The wobble detector 325 is constructed to detect a push-pull signal, which indicates the wobble signal, and to output the push-pull signal to the timing generator 345, on the basis of the output signal corresponding to the amount of received light from the head amplifier 311, as a detector for receiving a reflected light beam, which is disposed in the optical pickup 310.

The LPP data detector 326 is constructed to detect a push-pull signal, which indicates a LPP signal, and to detect the pre-format address information, as described later, for example, on the basis of the output signal corresponding to the amount of received light from the head amplifier 311, as a detector for receiving a reflected light beam, which is disposed in the optical pickup 310. The LPP data detector 326 is also constructed to output the pre-format address information to the timing generator 345.

The envelope detector 330 is constructed to detect the peak value and the bottom value of envelope detection of the RF signal, as the output signal from the head amplifier 311 in order to determine the optical recording power, under the control of the CPU 400, at the time of reproduction of the OPC pattern in the OPC process. The envelope detector 330 may include an A/D (Analog/Digital) converter or the like, for example.

The OPC pattern generator 340 is constructed to output a signal indicating the OPC pattern, to the LD driver 320, on the basis of a timing signal from the timing generator 345, at the time of recording the OPC pattern in the OPC process before the recording operation.

The timing generator 345 detects absolute position information based on the management unit of the pre-format address information (e.g. ADIP word), on the basis of the pre-format address information inputted from the LPP data detector 326, at the time of recording the OPC pattern in the OPC process. Simultaneously, it detects relative position information based on a slot unit (e.g. a slot unit corresponding to the length which is a natural number multiple of one cycle of the wobble signal) smaller than the management unit of the pre-format address information, on the basis of the cycle of the push-pull signal indicating a wobble signal. Thus, the timing. generator 345 can specify a recording start position, regardless of whether or not the recording start position in the OPC process is started from the management unit of the pre-format address information, i.e. the boundary of each ADIP word. After that, it generates and outputs a timing signal for writing the OPC pattern on the basis of the cycle of the push-pull signal indicating the wobble signal outputted from the wobble detector 325. On the other hand, the timing generator 345 can specify a reproduction start position, at the time of reproducing the OPC pattern in the OPC process, as in the recording. After that, it generates and outputs a timing signal for sampling the reproduced OPC pattern on the basis of the cycle of the push-pull signal indicating the wobble signal outputted from the wobble detector 325.

The data collector 350 is mainly a general memory. Specifically, it is constructed from an external RAM or the like, for example. The envelope detected by the envelope detector 330 is stored into the data collector 350. On the basis of this, the detection of the optimum recording power on the CPU 400, i.e. the OPC process, is performed.

The buffer 360 is constructed to store therein the record data modulated by the DVD modulator 370, and output it to the LD driver 320.

The DVD modulator 370 is constructed to perform DVD modulation on the record data, and to output it to the buffer 360. As the DVD modulation, for example, 8-16 modulation may be performed.

The data ECC generator 380 appends a code for error correction, to the record data inputted from the interface 390. Specifically, the data ECC generator 380 appends an ECC code by each predetermined block unit (e.g. an ECC cluster unit), and outputs it to the DVD modulator 370.

The buffer 385 stores therein the reproduction data outputted from the RF detector 312, and outputs it to the external output equipment through the interface 390.

The interface 390 receives an input of the record data or the like, from external input equipment, and outputs it to the data ECC generator 380. Moreover, the interface 390 may be constructed to output the reproduction data outputted from the RF detector 312, to the external output equipment, such as a speaker and a display.

The CPU 400 controls the entire information recording/reproducing apparatus 300, by giving an instruction to each device, i.e. by outputting a system command to each device, such as the LD driver 320 and the servo circuit 315, in order to detect the optimum recording power. Typically, software for operating the CPU 400 is stored in an internal or external memory.

Incidentally, one specific example of the "optimum-recording-power detecting device" of the present invention is constructed, including the CPU 400, the envelope detector 330, the OPC pattern generator 340, the timing generator 345, and the LD driver, or the like, described above.

Incidentally, obviously, the information recording/reproducing apparatus 300 shown in FIG. 2 functions as an information recording apparatus capable of recording the data, mostly by virtue of the optical pickup 310, the LD driver 320, the buffer 360, the DVD modulator 370, the data ECC generator 380, and other constituent elements. Moreover, obviously, it functions as an information reproducing apparatus capable of reproducing the data, mostly by virtue of the optical pickup 310, the head amplifier 311, the RF detector 312, and other constituent elements.

Next, with reference to FIG. 3 to FIG. 6, an explanation will be given for the OPC process of detecting the optimum recording power, i.e. the calibration of the recording laser power, performed by the information recording/reproducing apparatus in the first embodiment of the information recording apparatus of the present invention. The "optimum recording power" herein is not limited to a literal meaning of the most suitable laser power for the information recording, but is a wide concept including even a laser power to the extent that information can be recorded more properly at the time of recording. More specifically, it is a recording laser power for recording, to obtain the most excellent reproduction quality, which enables the least influence of asymmetry and a near-minimum jitter value representing the quality of recording features, for example. Moreover, the "asymmetry" is a phenomenon in which a short pit becomes longer little by little, or a long pit becomes shorter little by little, by the same amount in the length direction thereof, at mass production of the optical disc. In the embodiment, the degree of the influence of this asymmetry is quantitatively expressed as an "asymmetry value" described later. Here, FIG. 3 is a group of schematic timing charts showing one OPC process in the case of 11 power-steps on the information recording/reproducing apparatus in the first embodiment of the information recording apparatus of the present invention. FIG. 4 is a schematic signal amplitude diagram showing a reproduction RF signal in one OPC process in the case of 11 power-steps on the information recording/reproducing apparatus in the first embodiment of the information recording apparatus of the present invention. FIG. 5 is a graph showing asymmetry values plotted in respective power steps in one OPC process on the information recording/reproducing apparatus in the first embodiment of the information recording apparatus of the present invention. FIG. 6 is a waveform chart showing the detail of one power step out of one OPC process on the information recording/reproducing apparatus in the first embodiment of the information recording apparatus of the present invention.

In FIG. 3, the vertical axis of a graph (a) indicates the value of a recording laser power, and the horizontal axis thereof indicates a time axis time-divided for each power step. A graph (b) shows time sections in which the generated recording laser is changed alternately for a short pit pulse of 2T pulse and for a long pit pulse of 8T pulse and irradiated, for example. A graph (c) shows, with arrows, timing in which the recording laser is irradiated for the purpose of the calibration of 11 different laser powers. The vertical axis of a graph (d) indicates an amplitude voltage of a reproduction Radio Frequency (RF) signal. A graph (e) shows, with arrows, sampling timing for calculating an amplitude center voltage of the reproduction RF signal.

In the embodiment, as shown in the graph (a) of FIG. 3, the recording laser for calibration is time-divided for each of the 11 power-steps and irradiated with the 11 different laser powers onto the OPC area of the optical disc, for example. At this time, in each power-step, the recording laser generated by alternately changing the short pit pulse of 2T pulse and the long pit pulse of 8T pulse, for example, which are a test signal with the shortest pit length and a test signal with the longest pit length, of a 2-3 modulated signal, is irradiated to perform the recording. Here, as shown in FIG. 3, the former half of one power-step is assigned to a time length for recording the short pit pulse and regarded as a "short pit section". On the other hand, the latter half of the one power-step is assigned to a time length for recording the long pit pulse and regarded as a "long pit section".

Incidentally, as shown in FIG. 4, in one OPC process, the RF signal is reproduced, with respect to the time axis based on a land pre pit, as described above. The length in the track direction of the information recording surface, required for the one OPC process, is about 10 mm in the case of a BD-R, for example. Moreover, in the case of a DVD-R, the length in the track direction required for one OPC process with 11 power steps, for example, is about 8.5 mm.

As shown in FIG. 5, in the embodiment, a laser power corresponding to such a power step that "the asymmetry value=0" is determined to be the optimum recording power. Incidentally, the vertical axis of FIG. 5 indicates such an asymmetry value "e−f", and the horizontal axis indicates the power step. An arrow indicates such a power step that "e=f" and "the asymmetry value=0".

As described above, the detection of the optimum recording power in the embodiment, i.e. the calibration of the recording laser power, is performed as obtaining the optimum recording power corresponding to the power step that "the asymmetry value=0". In particular, it is considered that timing between the both can be on, in accordance with a predetermined reference, at the time of recording the OPC pattern and at the time of reproducing the OPC pattern.

Incidentally, the number of power steps in one OPC process is not limited to 11, but may be approximately 10 to 20, for example. Alternatively, it may be less than or more than that. Moreover, in the embodiment, a 2T mark and a 8T mark are used to construct the OPC pattern; however, a 3T mark, a 7T mark, or the like, other than the above marks can be also used.

Particularly in the embodiment, in the case of a DVD-R, for example, the length in the track direction in one power step is about 0.77 mm.

Next, as shown in FIG. 6, in the embodiment, with regard to each power-step, a plurality of 2T marks (five 2T marks in FIG. 6) are recorded with the 2T pulses into one short pit section, and a plurality of 8T marks (two 8T marks in FIG. 5) are recorded with the 8T pulses into one long pit section. One pair of the short pit section and the long pit section as described above, i.e. a plurality of OPC pits having a predetermined pattern, is regarded as the "OPC pattern". The one OPC process is completed by repeatedly recording the OPC pattern as shown in FIG. 6, only by the number of the power-steps (i.e. 11 times), while the laser power is sequentially changed.

After completion of the recording of the OPC pattern for each power-step, as shown in FIG. 6, with respect to the 11 power-steps in the one OPC process as described above, a process of reproducing this OPC pattern is performed. Specifically, after completion of the recording of the OPC pattern with the amount of the 11 power-steps, the laser with which the OPC area is irradiated is changed from the recording laser to reproduction laser (e.g. the laser power is changed to a reproduction laser power, which is much weaker than that of the recording laser power). By the irradiation of the reproduction laser, the reproduction process including envelope detection or the like is performed as follows.

At the time of reproduction in the OPC process, the peak value and the bottom value of the envelope of the reproduction RF signal corresponding to the OPC pits formed in the short pit section (i.e. the 2T marks), for example, are sampled in the sampling timing, shown in the graph (e) of FIG. 3, by which the amplitude center voltage is calculated. In the graph (e) of FIG. 3, the value in each power-step of the calculated amplitude center voltage is plotted with a black circle, and an interpolation line connecting the values is shown in a solid line. In the same manner, the value in each power-step of the calculated amplitude center voltage of the reproduction RF signal corresponding to the OPC pits formed in the long pit section (i.e. the 8T marks) is plotted with a white circle, and an interpolation line connecting the values is shown in a broken line. The intersection of the two interpolation lines is shown with a double circle, and a laser power in the power-step corresponding to the intersection is determined to be the optimum recording laser power.

More specifically, as shown in FIG. 6, it is assumed that the peak value of the envelope of the reproduction RF signal which is reproduced in the short pit section is "a", and that the bottom value thereof is "b". Incidentally, the "a" and "b" are collected in the sampling timing, as described above. It is assumed that the mean value of the both values, i.e. the calculated amplitude center voltage, is "e". Namely, "e=(a+b)/2". In the same manner, it is assumed that the peak value of the envelope of the reproduction RF signal which is reproduced in the long pit section is "c", and that the bottom value thereof is "d". It is assumed that the calculated amplitude center voltage is "f=(c+d)/2".

In the embodiment, the extent of the influence of the asymmetry is judged by comparing "e" with "f". In FIG. 6, the amplitude center voltage "e" is larger than "f", and the both values disagree. Namely, the above-mentioned "asymmetry value" is defined as "e−f". Then, a laser power corresponding to such a power step that "e=f" and the "asymmetry value=0", is determined to be the optimum recording laser power.

(Flow of the OPC Process and the Recording Process Performed by Information Recording/Reproducing Apparatus in the First Embodiment of the Information Recording Apparatus)

Next, with reference to FIG. 7 and FIG. 8, an explanation will be given for a flow of the OPC process and the recording operation, performed by the information recording/reproducing apparatus in the first embodiment of the information recording apparatus of the present invention. FIG. 7 is a flowchart showing a flow of the OPC process and the recording operation, performed by the information recording/reproducing apparatus in the first embodiment of the information recording apparatus of the present invention. FIG. 8 are schematic conceptual views showing relative positions where the OPC process is performed in one ECC block, by the information recording/reproducing apparatus in the first embodiment of the information recording apparatus of the present invention.

Firstly, in FIG. 7, if the optical disc 100 is loaded, firstly, a seek operation is performed by the optical pickup 310, under the control of the CPU 400. Then, various management information required for the recording process on the optical disc 100 is obtained, and simultaneously, the media type of the optical disc 100 is identified, and it is identified as a BD (Blu-ray Disc), for example (step S101).

Then, in a PCA (Power Calibration Area) defined for each identified optical disc 100, a normal OPC process is performed once (step S102). More specifically, by this, it is possible to judge whether or not the drive can correctly perform the recording operation.

Then, an unrecorded area in the data area is detected (step S103).

Then, an area where the OPC process is not performed is detected by judging whether or not marker information described later is recorded in the unrecorded area detected in the step S103 (step S104).

Then, it is judged whether or not the media type of the optical disc 100 is a DVD-R, for example (step S105). If the media type of the optical disc 100 is not a DVD but a BD, for example (step S105: No), the OPC process is performed in a central portion or latter-half portion of one ECC block in the area intended to know its recording features, detected in the step S103 and the step S104 (step S106). This is because one OPC process is within an allowable defect length. More specifically, in the BD, a burst error or the like which is about 10 mm long can be error-corrected, with respect to the length of one ECC block (about 83 mm), for example. Namely, the allowable defect length is about 10 mm. Moreover, in the case of the BD, the length required for one OPC process is about 10 mm. Thus, as shown in FIG. 8, by performing one OPC process requiring the length of about 10 mm, in the center portion or the latter-half portion of one ECC block which is about 83 mm long, for example, the error correction can be sufficiently performed even if the recording areas are damaged or destroyed or the like, so that the user data can be restored. Incidentally, a synchronization signal is recorded in the sector at the head of 16 sectors in one ECC block, so that it is preferable not to perform the OPC process in the head portion of one ECC block.

On the other hand, the case where the media type of the optical disc 100 is the DVD-R, for example (the step S105: Yes), will be described later as a second embodiment.

Then, under the control of the CPU, the optimum recording power detected in the OPC process in the step S106 is set so that the optical pickup irradiates the laser light with the power (step S107).

Then, the marker information, indicating whether or not the OPC process is performed in a position within a predetermined range of an ECC block located immediately before or after at least one ECC block where the OPC process is performed, is recorded with the optimum recording power detected in the OPC process in the step S106 or a step S203 described later (step S108). Incidentally, the details of the recording of the marker information will be described later.

Then, the data, such as user data, is actually recorded with the optimum recording power detected in the OPC process in the step S106 or the step S203 described later (step S109).

Then, under the control of the CPU, it is judged whether or not the recording operation is ended (step S110). Namely, it is judged whether or not all the data to be recorded in the recording operation is recorded, or whether or not an instruction to end the recording operation is given from a user.

As a result of the judgment, if it is judged that the recording operation is ended (the step S110: Yes), the recording operation is ended. On the other hand, if it is judged that the recording operation is not ended (the step S110: No), the operational flow returns to the step S109 again, to continue the recording operation.

Next, with reference to the above-mentioned FIG. 1, as occasion demands, in addition to FIG. 9, the operation and effect of the first embodiment of the information recording apparatus of the present invention will be studied. FIG. 9 is a graph showing the value of the optimum recording power plotted in the radial direction of a general optical disc. Incidentally, the vertical axis indicates the value of the optimum recording power (mW), and the horizontal axis indicates a position in the radial direction (mm).

As shown in FIG. 9, the fact that spin coating is used in most cases as a general method of manufacturing the write-once type optical disc, as one factor, triggers the variations in recording features in the position of the information recording surface of the write-once type optical disc. More specifically, it turns out that the value of the optimum recording power increases with movement from the inner to the outer circumferential side. Then, with respect to the optical disc, it is not desirable to apply the value of the optimum recording power detected in the OPC process performed in the OPC area 200 located on the inner circumferential side, at a constant state on the outer circumferential side, in terms of a proper recording operation corresponding to the features of the information recording surface. On the other hand, even if the value of the optimum recording power detected in the OPC process performed in the OPC area 201 located on the outer circumferential side, in addition to the OPC area 200 located on the inner circumferential side, is applied, it is difficult to perform the proper recording operation corresponding to the features of the information recording surface in the same manner, because the amount of the change in the value of the optimum recording power is not clear on the way to the inner circumferential side from the outer circumferential side.

Therefore, there is such a technical problem that it is impossible to use the value of the optimum recording power detected in the OPC process performed in the OPC area 200 or 201 located on the inner or outer circumferential side, as a proper value, in a position far away from the OPC area 200 or 201, such as a middle circumferential portion of the optical disc, for example.

Moreover, if the data is recorded at different speeds onto the same optical disc, the optimum recording power also greatly depends on the recording speed. If writing is performed in the OPC area 200 at a different speed, such as a 4×speed, with the value of the optimum recording power detected in the OPC process performed at a 1×speed, it is difficult to perform the proper recording operation corresponding to the features in the position of the information recording surface, which is also a technical problem.

With regard to the above-mentioned technical problems, the following method has been used; namely, the recording features corresponding to the type of the optical disc, the position of the information recording surface, and the recording speed, are researched in advance, and the reference value of the optimum recording power based on the recording features corresponding to the parameters, such as the type of the optical disc, is registered in the firmware of a disc drive, and in the actual recording operation, the registered reference value is used to estimate the value of the optimum recording power. Thus, it is necessary to mount algorithm for estimating the value of the optimum recording power, in the firmware program of the drive. However, a change in recording features is not always simple, but sometimes exponential, so it is anomalistic. Thus, there is a new technical problem that it is actually difficult to accurately estimate the amount of the change in the value of the optimum recording power.

In this regard, according to the information recording/reproducing apparatus in the first embodiment of the information recording apparatus of the present invention explained with reference to FIG. 1 to FIG. 8, the OPC process is performed not in the OPC area 200 or 201 on the inner or outer circumferential side, but in the area into which the data is actually recorded, such as the data area 102, for example, so that it is possible to accurately detect the value of the optimum recording power corresponding to the variations in recording features of the information recording surface of the optical disc. Thus, the OPC process is performed even on the optical disc whose variations in the recording features are unknown, in the area into which the data is actually recorded, and in the OPC process, it is possible to perform the recording operation with the optimum recording power detected in the OPC process.

In addition, even in the case where the OPC area 200 or the like is not large enough or where the OPC area is run out, the OPC process can be performed if the unrecorded data area remains. Thus, it is possible to continue the recording operation and extend the lifetime of the optical disc.

Moreover, the OPC process is performed in the area into which the data is actually recorded, such as the data area 102, for example, so that it is unnecessary to displace the optical pickup or the like, to the OPC area located on the inner or outer circumferential side or the like. Thus, it is possible to reduce a time length required for the OPC process.

(Flow of the OPC Process and the Recording Process Performed by a Second Embodiment of the Information Recording Apparatus)

Next, with reference to the above-mentioned FIG. 7, in addition to FIG. 10 and FIG. 11, an explanation will be given for a flow of the OPC process and the recording operation, performed by an information recording/reproducing apparatus in a second embodiment of the information recording apparatus of the present invention. FIG. 10 is a schematic conceptual view showing division of the OPC process by the information recording/reproducing apparatus in the second embodiment of the information recording apparatus of the present invention. FIG. 11 is a schematic conceptual view showing such a structure that the divided OPC process is distributed into a plurality of ECC blocks by the information recording/reproducing apparatus in the second embodiment of the information recording apparatus of the present invention.

The basic structure, the operation, and the OPC process or the like of the information recording/reproducing apparatus in the second embodiment are substantially the same as those in the first embodiment, explained with reference to FIG. 1 to FIG. 9.

In the second embodiment, as shown in the above-mentioned FIG. 7, as in the first embodiment, after the step S101 to the step S104, it is judged whether or not the media type of the optical disc 100 is a DVD-R, for example (the step S105). If the media type of the optical disc 100 is a DVD-R, for example (step S105: Yes), one OPC process is not within the allowable defect length, so that a predetermined division unit corresponding to the DVD-R is determined for division of the OPC process (step S201). Specifically, the predetermined division unit is determined as "1" power step of the OPC process. More specifically, in the case of the DVD-R, for example, the length required for one OPC process is about 8.5 mm. Thus, if one OPC process is provided with "11" power steps, for example, the length of the "1" power step of the OPC process, which is the predetermined division unit, i.e. the length of the divided OPC process, is about 0.77 mm (refer to FIG. 10).

Incidentally, more specifically, the size of the divided OPC process is preferably smaller than the size defined in the regulation of Black Dot defect or Interruption defect, and is preferably set to the size of a range which can be corrected by PO error correction. In addition, with regard to the divided OPC process, it may be divided for each power step, or for each power steps.

Then, a predetermined number corresponding to the DVD-R, i.e. how many times the divided OPC process is recorded in each ECC block, is determined (step S202). Specifically, it is determined such that the divided OPC process is recorded "1" time or once in each ECC block.

Then, the divided OPC process is performed by the predetermined number determined, in each ECC block (step S203). Specifically, the "1" power step of the OPC process, constructed from the 2T pulse and the 8T pulse, for example, is recorded only once in each ECC block (refer to FIG. 11). Incidentally, with regard to a position where the divided OPC process is recorded, the sector at the head of 1ECC block where the synchronization signal is recorded, or the like is desirably avoided, and the center portion or the latter-half portion is desirable. Thus, one OPC process is distributed into a total of "11" ECC blocks and performed. More specifically, in the DVD-R or CD-R or the like, a burst error or writing error caused by out-of-control tracking servo, which is about 5 mm long, can be corrected, with respect to the length of one ECC block (about 83 mm), for example. Namely, the allowable defect length is about 5 mm. Thus, by virtue if "1" power step of the OPC process requiring the length of about 0.77 mm, the error correction can be sufficiently performed even if the recording areas are damaged or destroyed or the like in one ECC block, so that the user data can be restored.

The subsequent recording operation or the like is the same as that explained in the first embodiment in the above-mentioned FIG. 7.

(Flow of the OPC Process and the Recording Process Performed by a Third Embodiment of the Information Recording Apparatus)

Next, with reference to the above-mentioned FIG. 7, in addition to FIG. 12(a), FIG. 13, and FIG. 14, an explanation will be given for a flow of the OPC process and the recording operation, performed by an information recording/reproducing apparatus in a third embodiment of the information recording apparatus of the present invention. FIG. 12(a) is a schematic conceptual view showing such a structure that the divided OPC process is distributed into a plurality of ECC blocks and performed by the information recording/reproducing apparatus in the third embodiment of the information recording apparatus of the present invention. FIG. 13 is a schematic conceptual view showing such a situation that two of the divided OPC processes are recorded in one ECC block, by the information recording/reproducing apparatus in the third embodiment of the information recording apparatus of the present invention. FIG. 14 is a schematic conceptual view showing such a structure that marker information is recorded into an ECC block located immediately before the. ECC block where the divided OPC process is recorded by the information recording/reproducing apparatus in the third embodiment of the information recording apparatus of the present invention.

The basic structure, the operation, and the OPC process or the like of the information recording/reproducing apparatus in the third embodiment are substantially the same as those in the first and second embodiments, explained with reference to FIG. 1 to FIG. 11.

In the third embodiment, as shown in the above-mentioned FIG. 7, as in the second embodiment, as a result of the step S105, if the media type of the optical disc 100 is a DVD-R, for example (step S105: Yes), one OPC process is not within the allowable defect length, so that the predetermined division unit corresponding to the DVD-R is determined for division of the OPC process (the step S201). Specifically, the predetermined division unit is determined as "1" power step of the OPC process. More specifically, in the case of the DVD-R, for example, as described above, the length of the "1" power step of the OPC process, which is the predetermined division unit, i.e. the length of the divided OPC process, is about 0.77 mm (refer to the above-mentioned FIG. 10).

Then, the predetermined number corresponding to the DVD-R, i.e. how many times the divided OPC process is recorded in each ECC block, is determined (the step S202). Specifically, it is determined such that the divided OPC process is recorded "2" times or twice in each ECC block.

Then, the divided OPC process is performed by the predetermined number determined, in each ECC block (the step S203). Specifically, the "1" power step of the OPC process, constructed from the 2T pulse and the 8T pulse, for example, is recorded only twice in each ECC block (refer to FIG. 12(a)). Thus, one OPC process is distributed into a total of "6" ECC blocks and performed. More specifically, as described above, in the DVD-R or CD-R or the like, a burst error or the like, which is about 5 mm long, can be corrected, with respect to the length of one ECC block (about 83 mm), for example. Namely, the allowable defect length is about 5 mm. Thus, by recording twice the "1" power step of the OPC process requiring the length of about 0.77 mm, the error correction can be sufficiently performed even if the recording areas are damaged or destroyed or the like, by about 1.54 mm (about 0.77 mm×2) in one ECC block, so that the user data can be restored (refer to FIG. 13).

Then, in the above-mentioned step S107, the marker information, indicating whether or not the OPC process is performed in a position within a predetermined range of an ECC block located immediately before or after at least one ECC block where the OPC process is performed, is recorded with the set optimum recording power (the step S108). Specifically, as shown in FIG. 14, out of the data area 102, in a position within the predetermined range of the first and second ECC blocks, located immediately before "6" ECC blocks, which are third to the eighth, where the divided OPC process is performed, the marker information is recorded with the optimum recording power. Thus, in the above-mentioned step S104, it is possible to easily detect the area, such as the subsequent third to eighth ECC blocks, for example, where the OPC process is not performed, by judging whether or not the marker information is recorded in the first and second ECC blocks (the step S104). Incidentally, the reason that the marker information is recorded into the "2" ECC blocks, which are the first and the second, is to improve reliability.

The subsequent recording operation or the like is the same as that explained in the first embodiment in the above-mentioned FIG. 7.

(Flow of the OPC Process and the Recording Process Performed by a Fourth Embodiment of the Information Recording Apparatus)

Next, with reference to the above-mentioned FIG. 7, in addition to FIG. 12(b), an explanation will be given for a flow of the OPC process and the recording operation, performed by an information recording/reproducing apparatus in a fourth embodiment of the information recording apparatus of the present invention. FIG. 12(b) is a schematic conceptual view showing such a structure that the divided OPC process is distributed into a plurality of ECC blocks and performed by the information recording/reproducing apparatus in the fourth embodiment of the information recording apparatus of the present invention.

The basic structure, the operation, and the OPC process or the like of the information recording/reproducing apparatus in the fourth embodiment are substantially the same as those in the first, second, and third embodiments, explained with reference to FIG. 1 to FIG. 12(a).

In the fourth embodiment, as shown in the above-mentioned FIG. 7, as in the second embodiment, as a result of the step S105, if the media type of the optical disc 100 is a DVD-R, for example (step S105: Yes), one OPC process is not within the allowable defect length, so that the predetermined division unit corresponding to the DVD-R is determined for division of the OPC process (the step S201). Specifically, the predetermined division unit is determined as "2" power steps of the OPC process. More specifically, in the case of the DVD-R, for example, as described above, the length of the "2" power steps of the OPC process, which is the predetermined division unit, i.e. the length of the divided OPC process, is about 1.54 mm (about 0.77×2) (refer to FIG. 12(b)).

Then, the predetermined number corresponding to the DVD-R, i.e. how many times the divided OPC process is recorded in each ECC block, is determined (the step S202). Specifically, it is determined such that the divided OPC process is recorded "1" time or once in each ECC block.

Then, the divided OPC process is performed by the predetermined number determined, in each ECC block (the step S203). Specifically, the "2" power steps of the OPC process, constructed from the 2T pulse and the 8T pulse, for example, are recorded only once in each ECC block. Thus, one OPC process is distributed into a total of "6" ECC blocks and performed (refer to FIG. 12(b)). More specifically, as described above, in the DVD-R or CD-R or the like, a burst error or the like, which is about 5 mm long, can be corrected, with respect to the length of one ECC block (about 83 mm), for example. Namely, the allowable defect length is about 5 mm. Thus, by recording once the "2" power steps of the OPC process requiring the length of about 1.54 mm, the error correction can be sufficiently performed even if the recording areas are continuously damaged or destroyed or the like, by about 1.54 mm (about 0.77 mm×2) in one ECC block, so that the user data can be restored (refer to FIG. 13).

The subsequent recording operation or the like is the same as that explained in the third embodiment in the above-mentioned FIG. 7.

(Flow of the OPC Process and the Recording Process Performed by a Fifth Embodiment of the Information Recording Apparatus)

Next, with reference to the above-mentioned FIG. 7, in addition to FIG. 12(c), an explanation will be given for a flow of the OPC process and the recording operation, performed by an information recording/reproducing apparatus in a fifth embodiment of the information recording apparatus of the present invention. FIG. 12(c) is a schematic conceptual view showing such a structure that the divided OPC process is distributed into a plurality of ECC blocks and performed by the information recording/reproducing apparatus in the fifth embodiment of the information recording apparatus of the present invention.

The basic structure, the operation, and the OPC process or the like of the information recording/reproducing apparatus in the fifth embodiment are substantially the same as those in the first, second, third, and fourth embodiments, explained with reference to FIG. 1 to FIGS. 12.

In the fifth embodiment, as shown in the above-mentioned FIG. 7, as in the second embodiment, as a result of the step S105, if the media type of the optical disc 100 is a DVD-R, for example (step S105: Yes), one OPC process is not within the allowable defect length, so that the predetermined division unit corresponding to the DVD-R is determined for division of the OPC process (the step S201). Specifically, the predetermined division unit is determined as "2" power steps of the OPC process. More specifically, in the case of the DVD-R, for example, as described above, the length of the "2" power steps of the OPC process, which is the predetermined division unit, i.e. the length of the divided OPC process, is about 1.54 mm (about 0.77 mm×2) (refer to FIG. 12(c)).

Then, the predetermined number corresponding to the DVD-R, i.e. how many times the divided OPC process is recorded in each ECC block, is determined (the step S202). Specifically, it is determined such that the divided OPC process is recorded "2" times or twice in each ECC block.

Then, the divided OPC process is performed by the predetermined number determined, in each ECC block (the step S203). Specifically, the "2" power steps of the OPC process, constructed from the 2T pulse and the 8T pulse, for example, is recorded only twice in each ECC block. Thus, one OPC process is distributed into a total of "4" ECC blocks and performed (refer to FIG. 12(c)). More specifically, as described above, in the DVD-R or CD-R or the like, a burst error or the like, which is about 5 mm long, can be corrected, with respect to the length of one ECC block (about 83 mm), for example. Namely, the allowable defect length is about 5 mm. Thus, by recording twice the "2" power steps of the OPC process requiring the length of about 1.54 mm, the error correction can be sufficiently performed even if the recording areas are damaged or destroyed or the like, by about 3.08 mm (about 1.54 mm×2) in one ECC block, so that the user data can be restored (refer to FIG. 13).

The subsequent recording operation or the like is the same as that explained in the third embodiment in the above-mentioned FIG. 7.

In the embodiments, as one specific example of the information recording apparatus, an information recording/reproducing apparatus for the write-once type optical disc, which is a large-volume recording medium, such as a CD-R, a DVD-R, and a BD-R, is explained. The present invention, however, can be also applied to an information recording/reproducing apparatus for a rewritable type optical disc, which is a large-volume recording medium, such as a CD-R/W, a DVD-R/W, and a BD-RE (Blu-ray Disc REwritable).

The present invention is not limited to the above-described embodiments, and various changes may be made, if desired, without departing from the essence or spirit of the invention which can be read from the claims and the entire specification. An information recording apparatus for and an information recording method of detecting the optimum recording power, which involve such changes, are also intended to be within the technical scope of the present invention.

INDUSTRIAL APPLICABILITY

The information recording apparatus and method, the information recording/reproducing apparatus and method, and the computer program of the present invention can be applied to a DVD recorder, a DVD player, or the like, for example. Moreover, they can be also applied to an information recording apparatus and the like, which are mounted on or which can be connected to various computer equipment for consumer use or for business use, for example.

The invention claimed is:

1. An information recording apparatus comprising:
a recording device capable of recording information into a data area of an information recording medium, by irradiating laser light, in conformity with a predetermined error correction method;
an optimum-recording-power detecting device for obtaining an optimum recording power of the laser light, by recording test writing data into a data area portion with a length which is equal to or less than an allowable defect length in the predetermined error correction method, within the data area, by using said recording device; and
a controlling device for controlling said recording device to record the information into the data area with the obtained optimum recording power.

2. The information recording apparatus according to claim 1, wherein said optimum-recording-power detecting device uses a near portion of a position into which the information is actually recorded, as the data area portion.

3. The information recording apparatus according to claim 1, wherein said optimum-recording-power detecting device uses a portion with a length which is shorter than the allowable defect length by a margin set in advance, as the data area portion.

4. The information recording apparatus according to claim 1, wherein said optimum-recording-power detecting device uses a portion other than a portion where a synchronization signal is recorded in the data area, as the data area portion.

5. The information recording apparatus according to claim 1, wherein said optimum-recording-power detecting device uses a portion with a length within a tolerance of a tracking servo error in tracking servo when the information is recorded or reproduced, as the data area portion.

6. The information recording apparatus according to claim 1, wherein said optimum-recording-power detecting device uses a portion with a length which is equal to or less than the allowable defect length, by each error correction unit in the predetermined error correction method, as the data area portion.

7. The information recording apparatus according to claim 1, wherein said optimum-recording-power detecting device distributes the data area portion into a plurality of error correction units in the predetermined error correction method, in a form of a divided portion with a length which is equal to or less than the allowable defect length, if the test writing data is longer than the allowable defect length.

8. The information recording apparatus according to claim 1, wherein said information recording medium has an exclusive test writing area to write therein the test writing data, apart from the data area, and
said optimum-recording-power detecting device firstly obtains the optimum recording power, by recording the test writing data into the exclusive test writing area by using the recording device before recording the test writing data into the data area portion, and records the test writing data into the data area portion after the exclusive test writing area is filled up with the test writing data.

9. An information recording method on an information recording apparatus comprising a recording device capable of recording information into a data area of an information recording medium, by irradiating laser light, in conformity with a predetermined error correction method, said information recording method comprising:
an optimum-recording-power detecting process of obtaining an optimum recording power of the laser light, by recording test writing data into a data area portion with a length which is equal to or less than an allowable defect length in the predetermined error correction method, within the data area, by using said recording device; and
a controlling process of controlling said recording device to record the information into the data area with the obtained optimum recording power.

10. An information recording/reproducing apparatus comprising:
a recording device capable of recording information into a data area of an information recording medium, by irradiating laser light, in conformity with a predetermined error correction method;
an optimum-recording-power detecting device for obtaining an optimum recording power of the laser light by recording test writing data into a data area with a length which is equal to or less than an allowable defect length in the predetermined error correction method, within the data area, by using said recording device;
a controlling device for controlling said recording device to record the information into the data area with the obtained optimum recording power; and
a reproducing device for reproducing the information from said information recording medium.

11. An information recording/reproducing method on an information recording/reproducing apparatus comprising a recording device capable of recording information into a data area of an information recording medium, by irradiating laser light, in conformity with a predetermined error correction method comprising:
a reproducing process of reproducing the information from an information recording medium;
an optimum-recording-power detecting process of obtaining an optimum recording power of the laser light, by recording test writing data into a data area portion with a length which is equal to or less than an allowable defect length in the predetermined error correction method, within the data area, by using said recording device; and
a controlling process of controlling said recording device to record the information into the data area with the obtained optimum recording power.

12. A computer readable recording medium recording thereon a computer program for tangibly embodying a program of instructions executable by a computer provided for an information recording apparatus, said computer program when executed by the computer performing the method steps of:
recording information into a data area of an information recording medium, by irradiating laser light, in conformity with a predetermined error correction method;
obtaining an optimum recording power of the laser light, by recording test writing data into a data area portion with a length which is equal to or less than an allowable defect length in the predetermined error correction method, within the data area, by using said recording step; and
controlling said recording step to record the information into the data area with the obtained optimum recording power.

13. A computer readable recording medium recording thereon a computer program for tangibly embodying a program of instructions executable by a computer provided for an information recording and reproducing apparatus, said computer program when executed by the computer performing the method steps of:

recording information into a data area of said information recording medium, by irradiating laser light, in conformity with a predetermined error correction method;

obtaining an optimum recording power of the laser light, by recording test writing data into a data area portion with a length which is equal to or less than an allowable defect length in the predetermined error correction method, within the data area, by using said recording step; and controlling said recording step to record the information into the data area with the obtained optimum recording power.

* * * * *

UNITED STATES PATENT AND TRADEMARK OFFICE
CERTIFICATE OF CORRECTION

PATENT NO. : 7,602,683 B2 Page 1 of 1
APPLICATION NO. : 10/591240
DATED : October 13, 2009
INVENTOR(S) : Katata et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 270 days.

Signed and Sealed this

Fifth Day of October, 2010

David J. Kappos
*Director of the United States Patent and Trademark Office*